United States Patent [19]
Takai et al.

[11] Patent Number: 5,504,774
[45] Date of Patent: Apr. 2, 1996

[54] DATA TRANSMITTING AND RECEIVING APPARATUS

[75] Inventors: Hitoshi Takai, Toyono; Yoshio Urabe, Ibaraki; Hidetoshi Yamasaki, Amagasaki, all of Japan

[73] Assignee: Matsushita Electric Industrial Co., Ltd., Osaka, Japan

[21] Appl. No.: 169,529

[22] Filed: Dec. 20, 1993

[30] Foreign Application Priority Data

Dec. 24, 1992 [JP] Japan ................................ 4-343929
Apr. 16, 1993 [JP] Japan ................................ 5-089614
Aug. 27, 1993 [JP] Japan ................................ 5-212828

[51] Int. Cl.$^6$ ............................................... H04K 1/10
[52] U.S. Cl. ............................................... 375/204
[58] Field of Search ............................. 375/1; 380/34

[56] References Cited

U.S. PATENT DOCUMENTS

| | | |
|---|---|---|
| 4,856,025 | 8/1989 | Takai . |
| 5,081,644 | 1/1992 | Uchida et al. . |
| 5,132,985 | 7/1992 | Hashimoto et al. . |
| 5,151,921 | 9/1992 | Hashimoto . |

FOREIGN PATENT DOCUMENTS

| | | |
|---|---|---|
| 3230726 | 2/1984 | Germany . |
| 62-45232 | 11/1987 | Japan . |
| 62-257224 | 11/1987 | Japan . |
| 1149627 | 6/1989 | Japan . |
| 2156734 | 6/1990 | Japan . |
| 4-97631 | 3/1992 | Japan . |

OTHER PUBLICATIONS

IEEE Proceedings I. Solid State & Electron Devices, vol. 139, No. 4–I, Aug. 1992, Stevenage GB, pp. 395–406, XP000309507, Darbyshire "A chirp modem incorporating interface excision".

"Data Transmission," William R. Bennett and James R. Davey, pp. 204–208.
English language abstract of Japanese Patent Publication No. 62-45232.
English language abstract of Japanese Patent Publication No. 62-257224.
English language abstract of Japanese Patent Publication No. 1-149627.
English language abstract of Japanese Patent Publication No. 2-156734.
English language abstract of Japanese Patent Publication No. 4-97631.
Bennet, William R. and Davey, James R., "Data Transmission", 1965.
Takai, Hitoshi, "BER Performance of Anti–Multipath Modulation Scheme PSK–VP and its Optimum Phase–Waveform", 1993.

*Primary Examiner*—David C. Cain
*Attorney, Agent, or Firm*—Greenblum & Bernstein

[57] ABSTRACT

A data transmitting and receiving apparatus is disclosed. The receiving apparatus receives a spread spectrum signal prepared by modulating a carrier wave with data to produce a data modulated signal and multiplying the data modulated signal with a spreading signal which has a bandwidth greater than that of the data modulated signal. The receiving apparatus may include three bandpass filters for passing three different band portions of a full band of the spread spectrum signal and producing an intermediate signal, and a detector for detecting data from the intermediate signal and for producing a detector output. The apparatus may also include a reception state evaluation device for detecting the current reception state of the detector and for producing a poor reception signal, when the detector is in a poor reception state. The poor reception signal is used for changing from a current band to another band.

34 Claims, 29 Drawing Sheets

(T···SYMBOL CYCLE PERIOD)

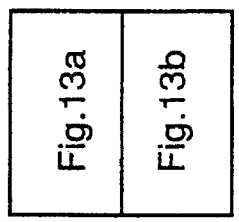
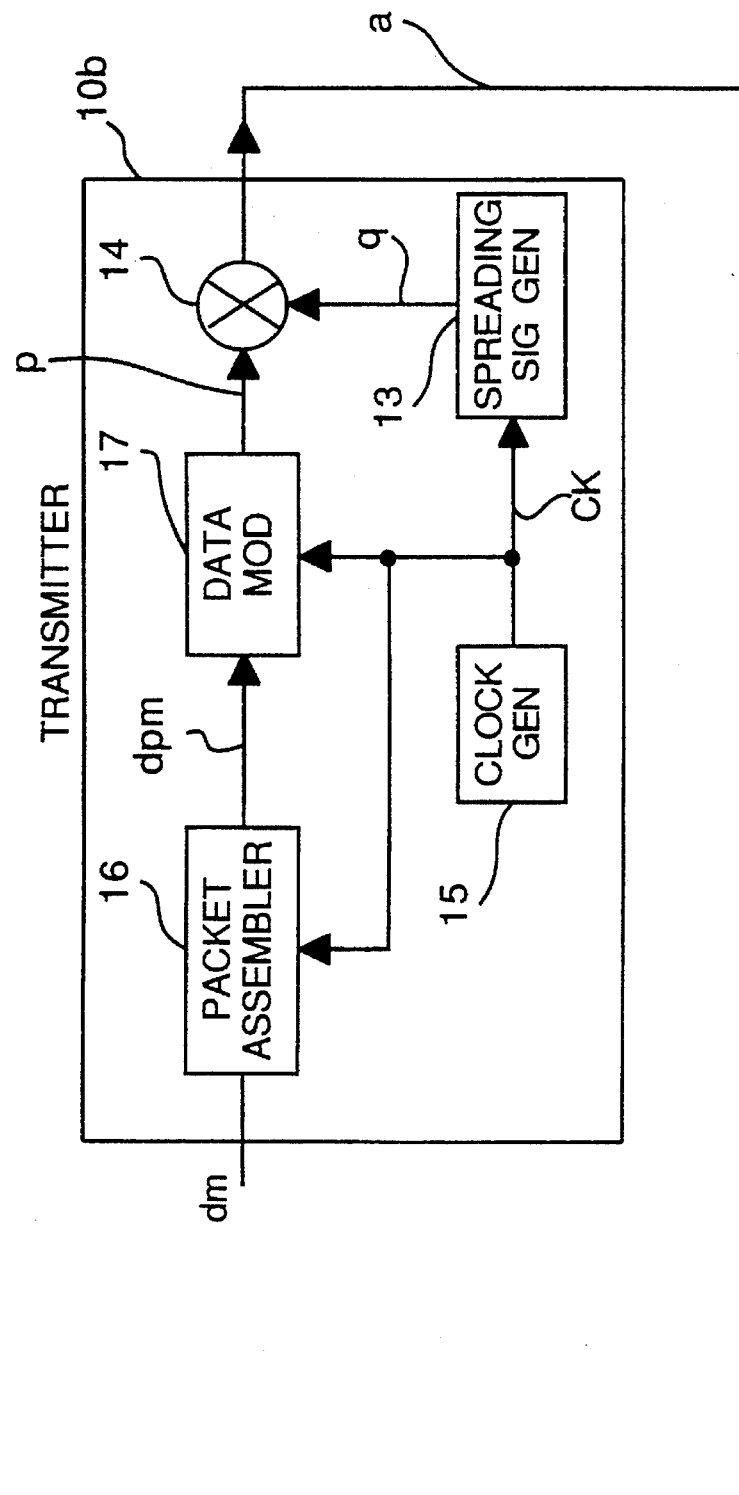
Fig.13a

DATA TRANSMITTING AND RECEIVING APPARATUS

BACKGROUND OF THE INVENTION

1. Field of the Invention

The present invention relates to a transmitting and receiving apparatus for data communications using a spread spectrum signal.

2. Description of the Prior Art

Spread spectrum communications has been identified as a suitable method for local area wireless data communications systems (e.g., wireless LANs) and power-line carrier (PLC) data communications because of its good transmission characteristics in multipath environments and excellent ability to eliminate interference signals. The major frequency band allocated to wireless LAN systems is the ISM band used by industry, science, and medicine. The ISM band is the frequency band used by devices using electromagnetic power waves, such as microwave ovens, and transmitters and receivers used in wireless LAN systems must be able to maintain normal data communications even under extremely high interference conditions.

A variety of methods not requiring spreading signal synchronization has been proposed as a means of simplifying the data receiver in spread spectrum communications. One of these methods is the spread spectrum differential detection method whereby the period of the spreading signal is synchronized to the data symbol period. An example of this method is described in Japanese patent laid-open number 1987-257224. The configuration and operation of a spread spectrum communications apparatus applying this spread spectrum differential detection method is described below with reference to accompanying figures.

FIG. 26 is a block diagram of a spread spectrum differential detection method transmitter and receiver. FIGS. 27a and 27b show waveform diagrams of the signals processed by various transmitter and receiver components. As shown in FIG. 26, the transmitter 10 comprises a differential encoder 11, PSK (phase shift keying) modulator 12, spreading signal generator 13, multiplier 14, and symbol clock generator 15. The clock generator 15 supplies the symbol clock CK of period T to the differential encoder 11, PSK modulator 12, and spreading signal generator 13.

The receiver 20' comprises a differential detector 22 and a decoder 23. The differential detector 22 further comprises a delay 221, multiplier 222, and low-pass filter (LPF) 223.

The bit stream data (binary data of value ±1) is read synchronized to the symbol clock CK, and is differential coded by the differential encoder 11. The PSK modulator 12 modulates the carrier wave with the differential coded data to obtain data modulated signal p, which is a binary PSK signal of symbol cycle period T. As a result, the data modulated signal p is the same phase as the previous symbol when data d is 1, and is opposite phase to the previous symbol when data d is −1. The spreading signal generator 13 generates the spreading signal q synchronized to and with the same period as the symbol clock CK. The spreading signal q is a constant amplitude, pseudorandom pulse wave generated from pseudorandom series. The multiplier 14 multiplies the data modulated signal p and spreading signal q to output the spread spectrum signal a.

FIG. 27a shows the time-based waveforms of the data modulated signal p, spreading signal q, and spread spectrum signal a. The baseband waves of the data modulated signal p and spread spectrum signal a are shown for convenience.

The spread spectrum signal a thus obtained is input through the transmission path to the receiver 20'. The differential detector 22 multiplies the received spread spectrum signal a by delayed signal $a_d$ (which is the spread spectrum signal a delayed symbol cycle period T by the delay 221) using the multiplier 222, and removes the high frequency component of the product using the LPF 223 to obtain detector output c. Because multiplying spreading signal components will always result in a constant value, only the data modulation component will appear in the detector output c. As with the differential detection output to the normal differential PSK signal, the detector output c is therefore a positive value when there is no phase change from the previous symbol, and is a negative value when opposite phase to the previous symbol. The decoder 23 outputs the decoded data d' as a value of +1 when the detection output c is positive, and −1 when negative.

FIG. 27b shows the time-based waveforms of the received spread spectrum signal a, delayed signal $a_d$, and detector output c. As in FIG. 27a, the baseband waves of the spread spectrum signal a and delayed signal $a_d$ are shown. It is to be noted that the normally received spread spectrum signal a has jamming, interference, or distortion components added in the transmission path. The effects of such jamming, etc., are removed from the waveforms shown in FIG. 27b.

By means of this configuration, a transmitter and receiver of relatively simple construction not requiring complex means for spreading signal synchronization and other functions can be obtained while retaining the jamming elimination capability and multipath transmission performance characteristic of spread spectrum communications.

When extremely strong interference components are added to the spread spectrum signal band, however, this transmitter and receiver is incapable of signal reception when the band of the interference component overlaps only part of the signal band. In addition, a wide band delay having a constant delay characteristic across the complete spread spectrum signal band must be used, and such delays are difficult to achieve.

SUMMARY OF THE INVENTION

Therefore, an object of the present invention is to provide a data transmitting and receiving apparatus that does not require a wide band delay and yet can reliably transmit and receive data signals even when there is an extremely strong interference component superimposed to the spread spectrum signal band.

To achieve this object, a data receiving apparatus for receiving a spread spectrum signal prepared by modulating data with a carrier wave to produce a data modulated signal and multiplying the data modulated signal with a spreading signal which has a bandwidth greater than that of the data modulated signal, comprises bandpass means for passing a portion of a full band of said spread spectrum signal and for producing a bandpass signal; and detection means for detecting an intermediate signal from said bandpass signal and for producing a detection signal.

Note that the spread spectrum signal is preferably a chirp signal.

The data modulated signal is also preferably a differential PSK signal, and the detection means is preferably a differential detector. When differential detection is used, the bandwidth of the signal processed by the differential detector is smaller than the bandwidth of the spread spectrum signal, and a narrow band delay can therefore be used in the differential detector.

It is further preferred to selectively use a band not containing interference components by changing the bandpass frequency of the bandpass means, or by selecting one of plural bandpass frequencies. In addition, the quality of the detection output is preferably improved by synthesizing plural detection outputs.

The bandpass means can be achieved by means of a frequency mixer, local oscillator, and bandpass filter. In this case, the bandpass frequency can be changed by changing the frequency of the local oscillation signal output by the local oscillator. When differential detection is used, the frequency change of the local oscillation signal is set to an integer multiple of 1/symbol period.

An alternative embodiment of a data transmitting and receiving apparatus according to the present invention comprises a transmitter and a receiver. The transmitter transmits a burst-type spread spectrum signal which is formed by dividing the transmission data into blocks containing a predetermined number of bits to generate data packets containing a unique word and an error detection bit. The data modulated signal, which is obtained by data modulation of the carrier wave with this data packet, is multiplied with a spreading signal, which has a bandwidth greater than that of the data modulated signal, to obtain and produce the burst-type spread spectrum signal.

The receiver for demodulating the spread spectrum signal to output the decoded data comprises plural channels each comprising a bandpass means, detector, clock generator, decoder, unique word detector, packet extractor, and error detector for extracting and demodulating only the mutually different partial bandwidth signal components in the spread spectrum signal band, and a selector for selecting an output from a channel not containing any bit errors based on the error detection means output to generate the decoded data.

A data transmitting and receiving apparatus thus comprised detects intermediate signals by extracting one or plural partial band signal components in the spread spectrum signal bandwidth, and selectively obtains the outputs of one or more decoders not containing bit errors as the decoded data. As a result, the effects of signal deterioration caused by high strength interference waves present in the signal band and frequency-selective distortion resulting from multipath transmission can be avoided, and signal components extracted from the frequency band with good reception can be selectively used. As a result, deterioration of the error rate due to strong interference or frequency-selective distortion can be reduced.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
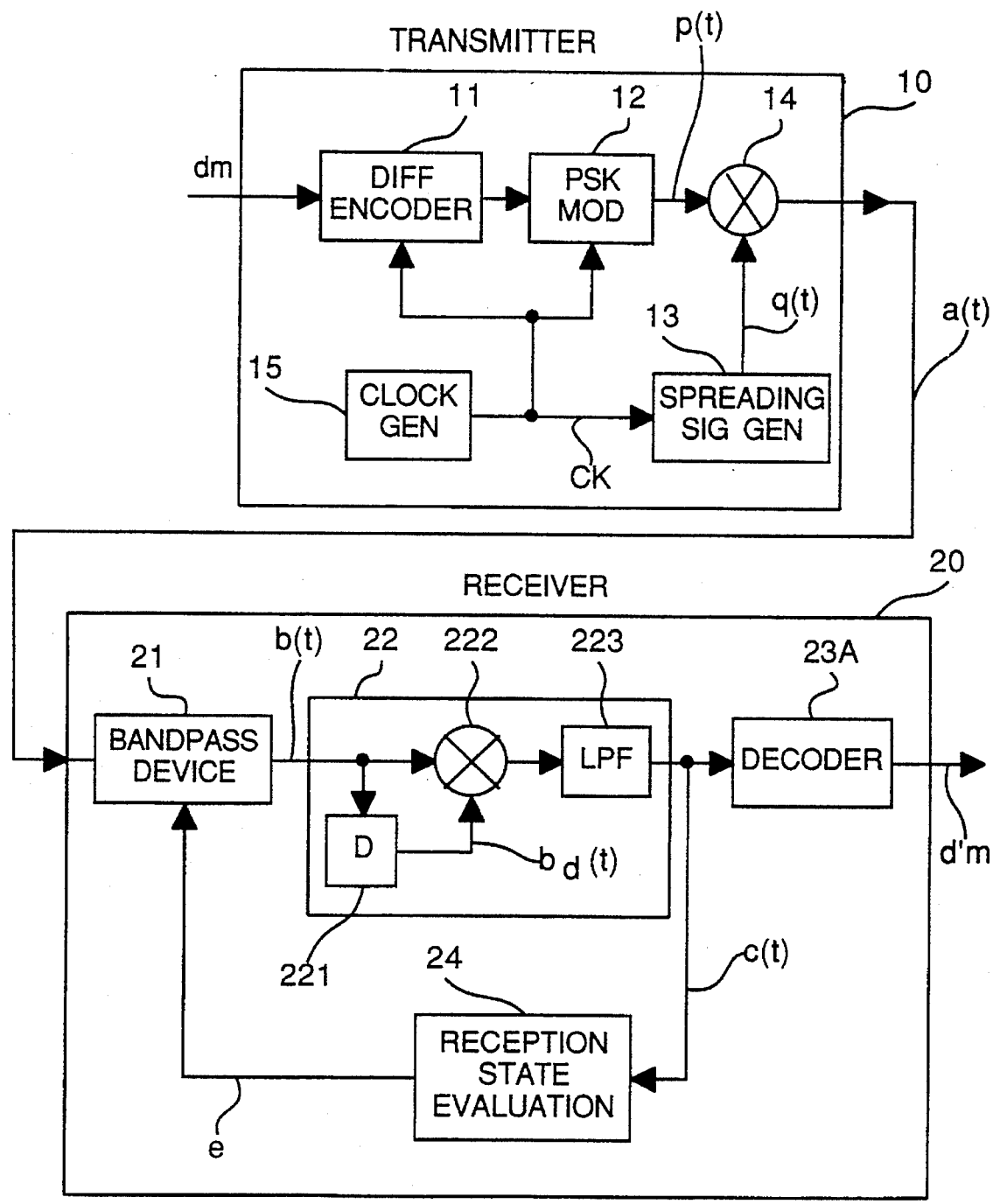
FIG. 1 is a block diagram of a data transmitting and receiving apparatus according to the first embodiment of the invention.
Figure 3A:
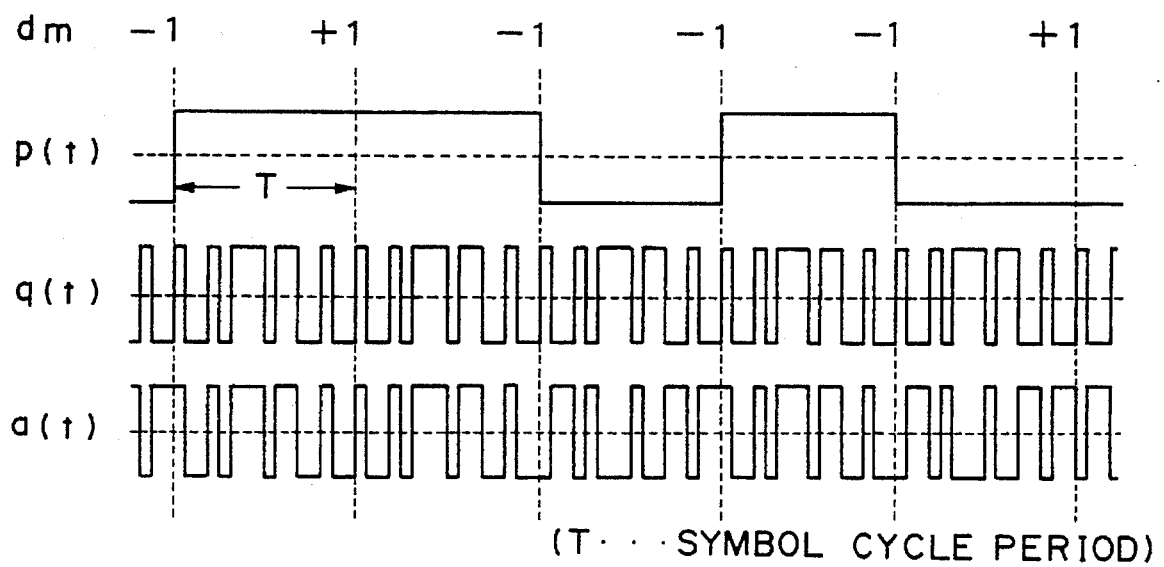
FIGS. 3a and 3b are waveform diagram of signals in the first embodiment.
Figure 3B:
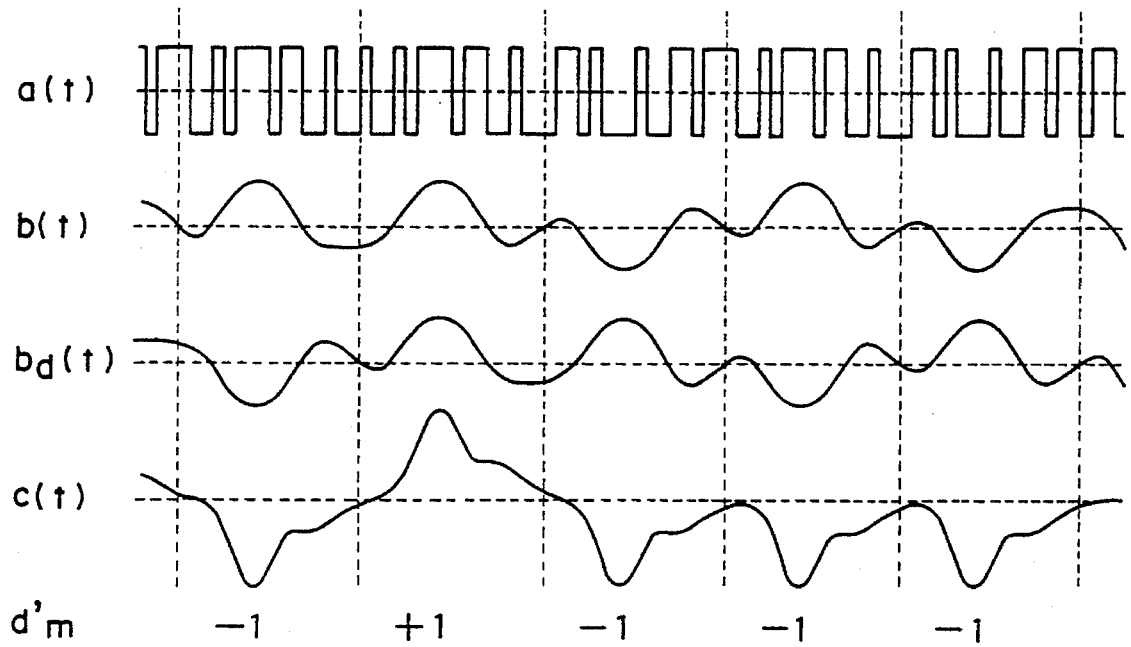
Figure 4A:
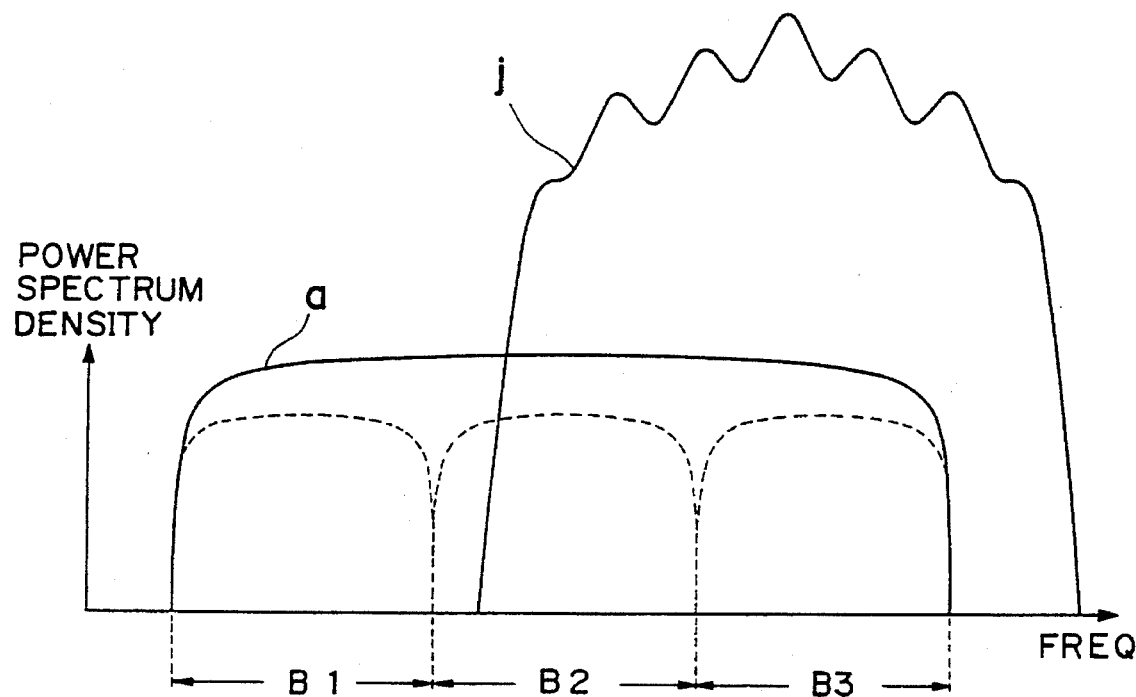
FIGS. 4a and 4b are a spectrum diagram of signals in the first embodiment.
Figure 4B:
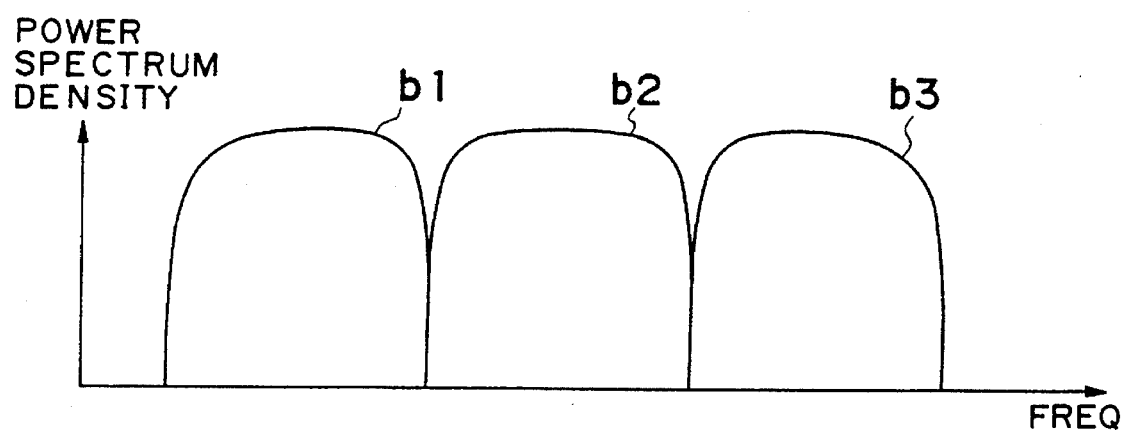

FIG. 1 is a block diagram of a data transmitting and receiving apparatus according to the first embodiment of the invention. FIGS. 3a and 3b show waveform diagrams of the signals observed at major points in the apparatus shown in FIG. 1. Note that the baseband wave is shown for convenience. FIGS. 4a and 4b are simplified spectrum diagrams of the signals at selected points.

As shown in FIG. 1, the transmitter 10 comprises differential encoder 11, PSK modulator 12, multiplier 14, clock generator 15, and spreading signal generator 13, and outputs the spread spectrum signal a(t). The receiver 20 comprises bandpass device 21, differential detector 22, decoder 23, and reception state evaluation device 24.

Figure 26:
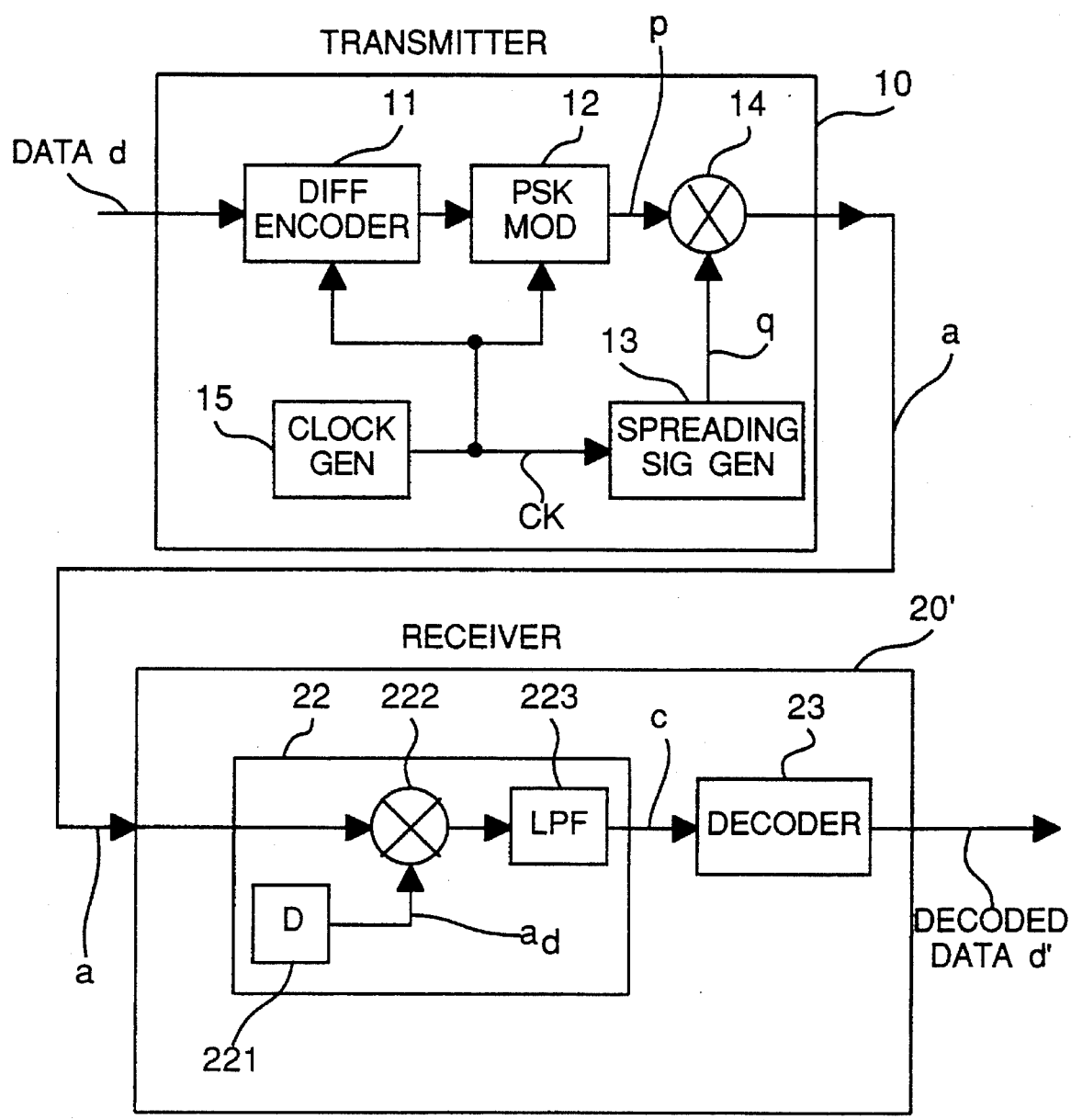
FIG. 26 is a block diagram of a prior art data transmitting and receiving apparatus.
Figure 27A:
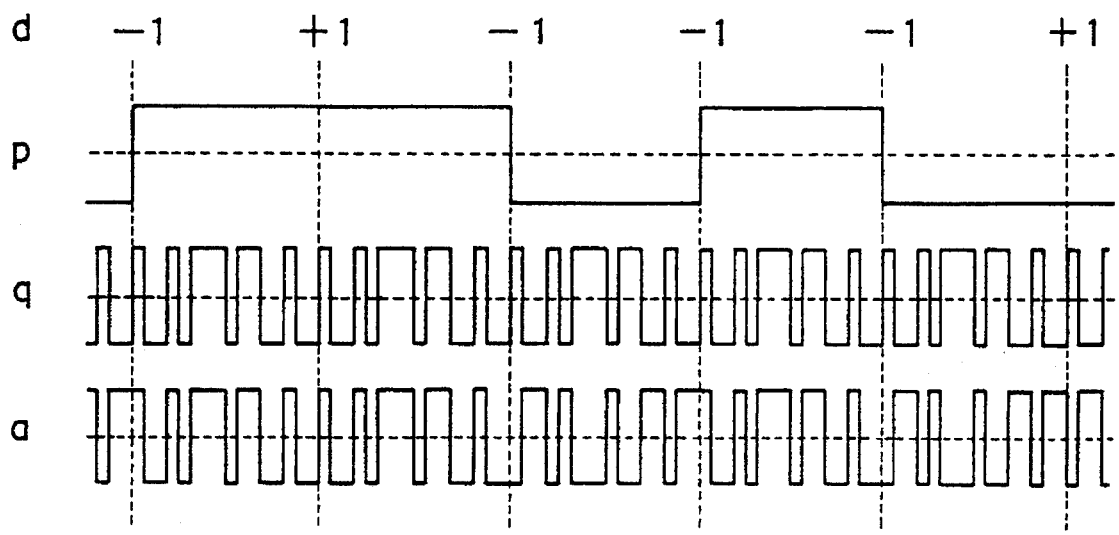
FIGS. 27a and 27b are waveform diagrams of the signals in the prior art data transmitting and receiving apparatus.
Figure 27B:
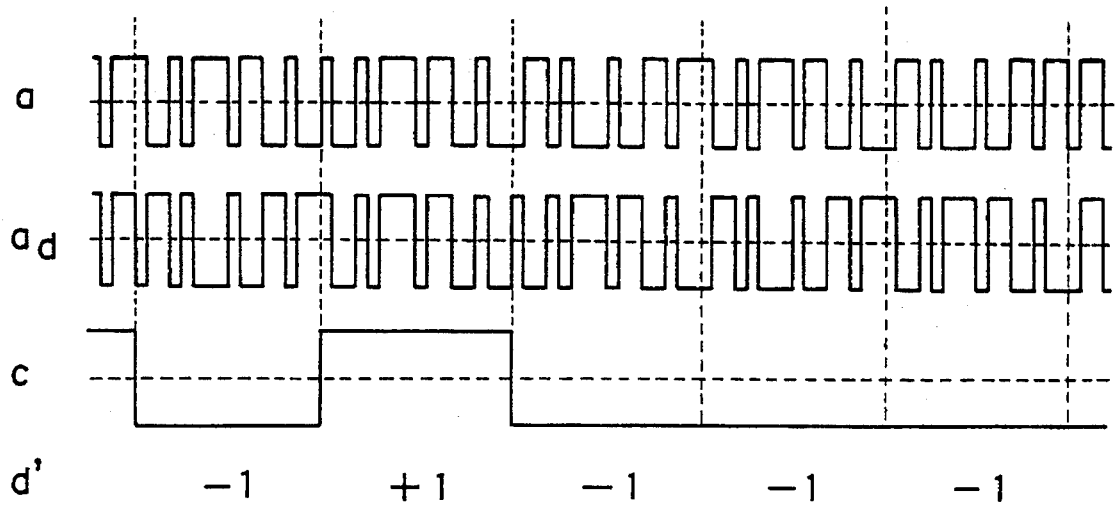

The operation of the transmitter 10 shown in FIG. 1 is similar to that described with reference to FIG. 26 in the discussion of the prior art above. Specifically, the $m^{th}$ data item $d_m$ (a binary value of plus or minus 1) is obtained synchronized to the symbol clock CK of period T and differential coded by the differential encoder 11, and is modulated by the PSK modulator 12 to obtain the data modulated signal p(t), a binary PSK (phase shift keying) modulated signal of symbol cycle period T. The spreading signal generator 13 generates a spreading signal q(t) synchronized to and with the same period as the symbol clock CK. This spreading signal q(t) may be, for example, a constant amplitude pseudorandom pulse wave generated from pseudorandom series. The multiplier 14 multiplies the data modulated signal p(t) and spreading signal q(t) to output the spread spectrum signal a(t).

This differential coded data can be expressed as $$d^m = \delta_m \times \delta_{m-1} \quad [1]$$

assuming $\delta_m$ is a binary value of +1 and −1. Therefore, if the frequency of the carrier wave is $f_c$ and the value Re[ ... ] is a real number, the spread spectrum signal a(t) transmitted during the symbol period corresponding to $\delta_m$ can be expressed as $$a(t) = Re[\delta_m \times q(t) \times \exp\{2\pi f_c t\}] \quad [2]$$

The signal waves at the selected transmitter components shown in FIG. 3a are simulated.

The spread spectrum signal a(t) input through the transmission path to the receiver 20 is first bandwidth limited by the bandpass device 21 to obtain intermediate signal b(t).

As shown in the bandpass device 21a in FIG. 2, this bandpass device 21 comprises first, second, and third bandpass filters, identified as BPF1 211, BPF2 212, and BPF3 213 below, and selects one of these bandpass filters for operation. Bandpass filters BPF1 211, BPF2 212, and BPF3 213 selectively pass three different pass bands B1, B2, and B3. The bandpass device 21a also has a counter 209 for counting from one to three repeatedly, and incremented each time a band selection signal e, which will be described later, from reception state evaluation device 24 is produced. When the counter 209 is counted to 1, the switch is connected in a manner shown in FIG. 2. Thus, the first bandpass filter BPF1 is selected to process the input signal a(t) in the first bandpass filter BPF1 and send out the filtered signal b(t). When the counter 209 is counted to 2, the switch is so connected to select the second bandpass filter BPF2, and when the counter 209 is counted to 3, the switch is so connected to select the third bandpass filter BPF3.

Thus, when the bandpass device 21 receives the band selection signal e from the reception state evaluation device 24, a filter different from the one currently used is sequentially selected by looping through the bandpass filters in a predetermined sequence, e.g., BPF1 → BPF2 → BPF3 → BPF1. The spectrum of the received spread spectrum signal a, and the pass bands B1–B3 of the bandpass filters are illustrated in FIG. 4a. The spectrum of the bandwidth limited output (intermediate signal b) is shown in FIG. 4b. When BPF1, BPF2, or BPF3 is selected, the band of the intermediate signal b(t) is b1, b2, or b3, respectively, as shown in FIG. 4b.

The differential detector 22 delays and detects the intermediate signal b(t) to obtain detector output c(t).

The baseband waves of the signals output by selected receiver components are simulated in FIG. 3b. In each symbol period, the symbol of the baseband wave of the spread spectrum signal a(t) is the same as the data modulated signal when the phases match, but is the reverse symbol when the phases are opposite.

The intermediate signal b(t) can be expressed as $$b(t) = Re[\delta_m \times q'(t) \times \exp\{2\pi f_c t\}] \quad [3]$$

where $\delta_m = \pm 1$. When the intermediate signal band is greater than the symbol repeat frequency, q'(t) in equation [3] is approximately equal to the signal obtained by bandwidth limiting spreading signal q(t). Because q(t) is thus replaced by q'(t) through bandwidth limiting, intermediate signal b(t) is a waveform significantly different from that of spread spectrum signal a(t). The phase relationship, however, remains the same, i.e., the waveforms are approximately equal when the phase matches the data modulated signal in each symbol period, but the symbols are opposite when the phase does not match the data modulated signal phase. This is because the symbol of the intermediate signal b(t) is reversed by the symbol of $\delta_m$ as indicated by equation [3]. More specifically, the waves are not precisely identical and intersymbol interference occurs in the region near the adjacent symbol because the signal is affected by the adjacent symbol. However, when the intermediate signal band is greater than the symbol repeat frequency, intersymbol interference is small and there is no real problem.

The differential detector 22 first delays the intermediate signal b(t) one symbol period T by means of the delay 221, obtaining delayed intermediate signal $b_d(t)$. Noting that the spreading signal q(t) is a repeated wave of period T and q'(t) will also be approximately a repeated wave of period T, $$\begin{aligned} b_d(t) &= b(t - T) \\ &= Re[\delta_{m-1} \times q'(t) \times \exp\{2\pi f_c t\}] \times \\ &\quad \exp\{-2\pi f_c T\}. \end{aligned} \quad [4]$$

By precisely controlling T or adjusting the phase of the delay 221 output signal so the statement $$\exp\{-2\pi f_c T\} = 1 \quad [5]$$

is true, the delayed intermediate signal $b_d(t)$ becomes $$b_d(t) = Re[\delta_{m-1} \times q'(t) \times \exp\{2\pi f_c t\}]. \quad [6]$$

The detector output c(t) is the low frequency component of the multiplier 222 output extracted by the LPF 223. Thus, by multiplying equations [3] and [6], eliminating the item of the high frequency component $\exp\{4\pi f_c t\}$, and using equation [1], $$c(t) = \delta_m \times \delta_{m-1} \{Re[q'(t)]\}^2 = d_m \{Re[q'(t)]\}^2 \quad [7]$$

is obtained. By evaluating the polarity of the detector output c(t) from equation [7], the data can be decoded.

FIG. 3b simulates the wave detection process. Specifically, multiplied same (or similar) wave pulses result in a positive pulse when there is no phase change from the preceding wave symbol, but a negative pulse when the phase is reversed from that of the previous wave symbol because opposite-symbol pulses are multiplied. As a result, detector output c(t) will become a positive or negative pulse depending upon whether the waves are of same or opposite phase. The decoder 23 evaluates the detector output c(t) pulse and outputs decoded data d'$_m$ as a value of 1 or −1 when the detector output c(t) is positive or negative, respectively.

Because the bandwidth of the intermediate signal b(t) handled by the differential detector 22 is narrower than that of the original spread spectrum signal a(t), the delay 221 is sufficiently precise if it operates within the bandwidth of the intermediate signal b(t), and it is specifically not necessary for the delay 221 to maintain high precision throughout the entire bandwidth of the spread spectrum signal a(t).

The reception state evaluation device 24 monitors the detector output c(t) level to estimate whether reception is currently good. If reception is determined to not be good, the band selection signal e is output to the bandpass device 21. The reception state evaluation device 24 has a comparator for comparing the detector output c(t) level with a predetermined threshold level and produces a band selection signal e when the detector output c(t) level is lower than the predetermined threshold level. For example, when the jamming j is present in the bands B2 and B3, as shown in FIG. 4a, and if the currently used bandpass filter is BPF2 212, the reception state evaluation device 24 produces the band selection signal e to switch the bandpass device 21a from BPF2 212 to BPF3 213. Since the jamming j is also covering the band B3, reception state evaluation device 24 again produces the band selection signal e to switch the bandpass device 21a from BPF3 213 to BPF1 211. Since there is no jamming present in the band B1, the currently selected state using the bandpass filter BPF3 is maintained.

According to the above embodiment, the bandpass filters BPF1 211, BPF2 212, and BPF3 213 are explained to have three different pass bands B1, B2, and B3 shown in FIG. 4a. Alternatively, it is possible to arrange such that the bandpass filter BPF1 211 has a wide pass band, such as B1+B2+B3 in FIG. 4a, the bandpass filter BPF2 212 has an intermediate width pass band, such as B1+B2 in FIG. 4a, and the bandpass filter BPF3 213 has a narrow pass band, such as B1 in FIG. 4a.

Figure 5:
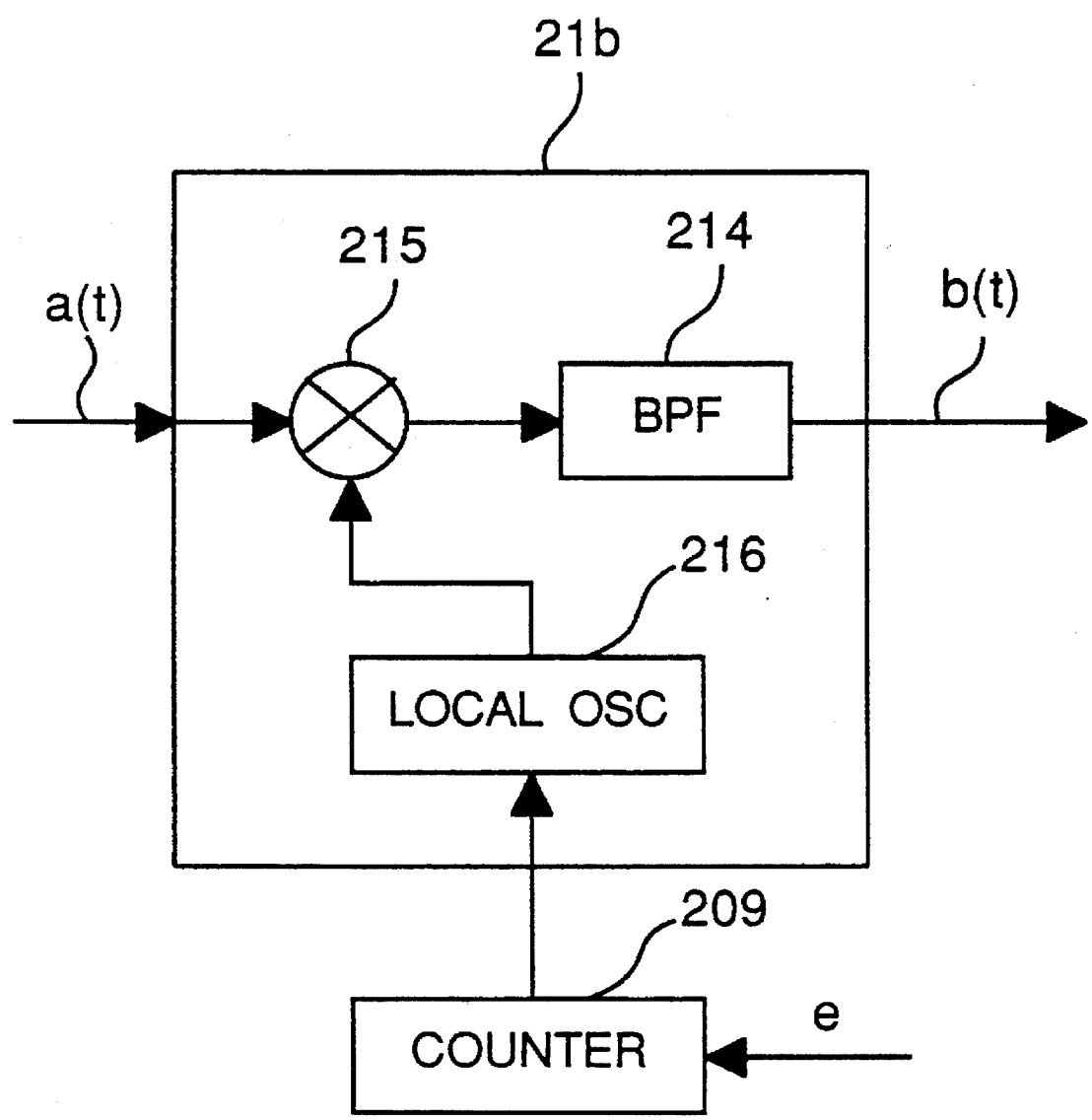
FIG. 5 is a block diagram of a modification of the bandpass device in this embodiment.

Referring to FIG. 5 a bandpass device 21 is shown which is a modification of the same shown in FIG. 1. The bandpass device 21b comprises a bandpass filter BPF 214, frequency mixer 215, and local oscillator 216. The input signal is converted by the frequency mixer 215 to the frequency band obtained as the difference between the input signal and the local oscillation signal output from the local oscillator 216, and is then bandwidth limited by the BPF 214 to extract a partial frequency component of the frequency-converted spread spectrum signal a(t). The partial frequency component is output as intermediate signal b(t). The local oscillator 216 is normally a phase locked loop (PLL) synthesizer, and can change the frequency of the local oscillation signal at an interval that is an integer multiple of symbol rate 1/T. This configuration equivalently extracts the intermediate signal b(t) as a component of a different frequency part of the spread spectrum signal a(t). Note that if the local oscillation signal frequency is set to the middle frequency of the pass band, a low bandpass filter can be used in place of BPF 214.

Figure 6A:
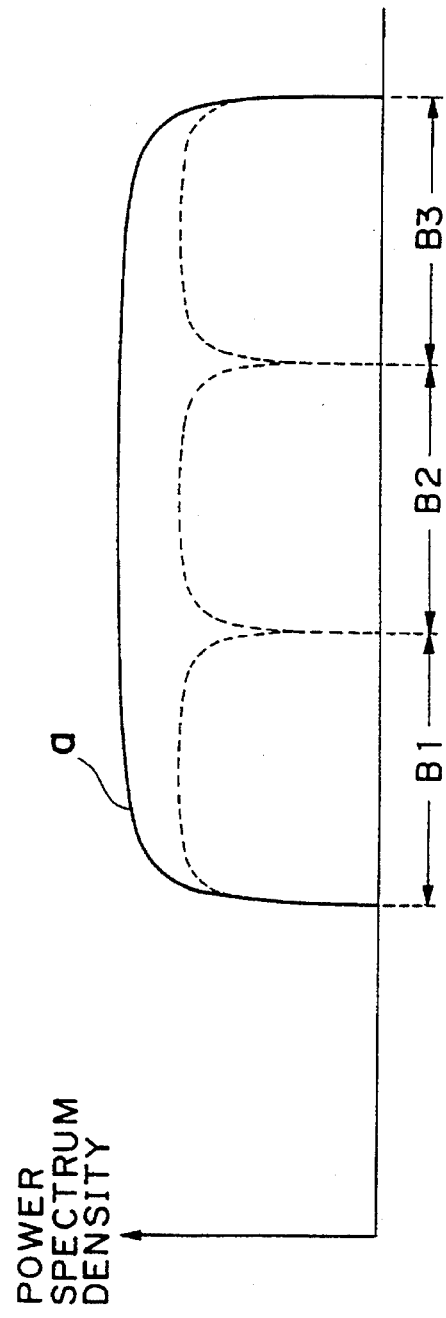
FIGS. 6a and 6b are a spectrum diagram of the signals from the bandpass device shown in FIG. 5.
Figure 6B:
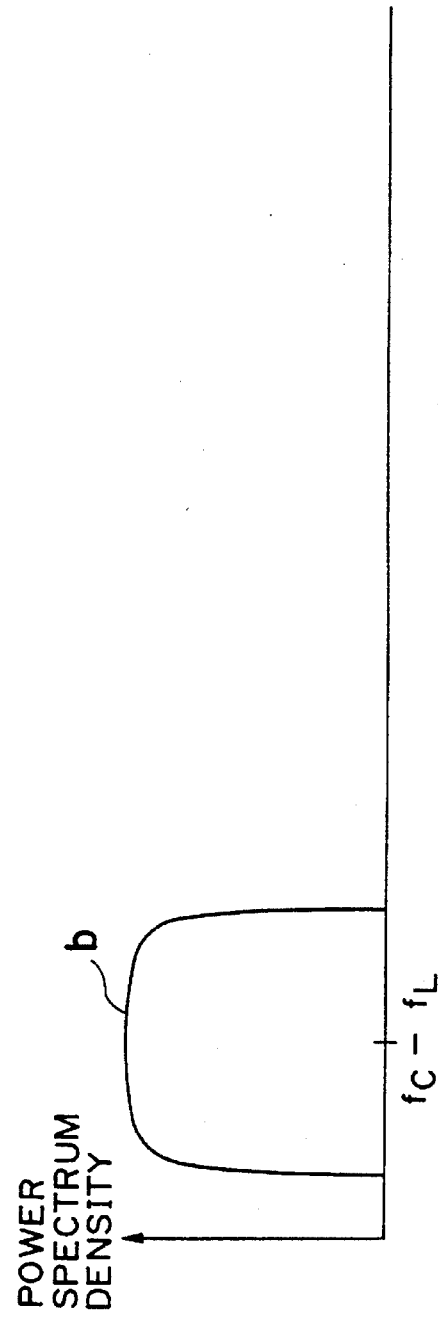

FIG. 6a shows the pass bands (pass band 1 B1, pass band 2 B2, and pass band 3 B3) when the frequency of the local oscillation signal is varied three ways. FIG. 6b shows the spectrum b of the frequency-converted, bandwidth-limited intermediate signal. As shown in FIG. 6a, each of the pass bands B1–B3 is set to a different frequency. When the band selection signal e is input from the reception state evaluation device 24, counter 209 counts up to switch the local oscillator 216 and to change the frequency of the local oscillation signal, and sequentially changes the pass band to a band different from that currently in use by looping through the pass bands in a predetermined sequence, e.g., B1 → B2 → B3 → B1. Thus, the bandpass device 21b operates equivalently to the bandpass device 21a shown in FIG. 2. Compared with the configuration shown in FIG. 2, however, this bandpass device 21b can be achieved using a single bandpass filter. In addition, because the band of the intermediate signal b(t) is fixed, a relatively narrow band differential detector can be used downstream, and the overall configuration is thus simplified.

It is to be noted, however, that the delay/detection operations of the bandpass device shown in FIG. 5 will only function normally when the change in the local oscillation signal frequency is an integer multiple of 1/T as will be described below. If the frequency of the local oscillation signal is $f_L$, the intermediate signal b(t) can be expressed as $$b(t)=Re[\delta_m \times q'(t) \times \exp\{2\pi(f_c-f_L)t\}] \qquad [3']$$

and the delayed intermediate signal $b_d(t)$ as $$\begin{aligned}b_d(t) &= b(t-T) \qquad [4'] \\ &= Re[\delta_{m-1} \times q'(t) \times \exp\{2\pi(f_c-f_L)t\} \times \\ &\quad \exp\{-2\pi(f_c-f_L)T\}].\end{aligned}$$

By precisely controlling T or adjusting the phase of the delay 221 output signal so the statement $$\exp\{-2\pi(f_c-f_L)T\}=1 \qquad [5']$$

is true, the delayed intermediate signal $b_d(t)$ becomes $$b_d(t)=Re[\delta_{m-1} \times q'(t) \times \exp\{2\pi(f_c-f_L)t\}]. \qquad [6']$$

By multiplying equations [3'] and [6'], eliminating the item of the high frequency component $\exp\{4\pi(f_c-f_L)t\}$, and using equation [1], the detector output c(t) is obtained as $$c(t)=\delta_m \times \delta_{m-1}\{Re[q'(t)]\}^2 = d_m\{Re[q'(t)]\}^2 \qquad [7']$$

By evaluating the polarity of the detector output c(t) from equation [7'], the data can be decoded. By modifying equation [5'] obtained from the above process and defining k as an integer, $$f_L=f_c-k\times(1/T) \qquad [8]$$

is obtained, and we know that the frequency of the local oscillation signal must have a frequency interval of an integer multiple of symbol rate 1/T.

This embodiment is described in further detail below with reference to the receiver 20 operation when a jamming j as shown in FIG. 4a is applied to the transmission path. Normal reception by the conventional apparatus shown in FIG. 26 is not possible because most of the jamming j energy is detected by the differential detector. With the apparatus according to the present embodiment as shown in FIG. 1, however, the bandwidth of the received signal is limited by providing a bandpass device 21 before the differential detector 22. As a result, when the bandpass device 21 selects pass band 1 B1, the intermediate signal b is not affected by the jamming j, and normal reception is possible. If the bandpass device 21 selects either pass band 2 B2 or pass band 3 B3, however, the intermediate signal b is greatly affected by the jamming, and normal reception is not possible. If this state persists, the reception state evaluation device 24 determines that current reception is poor (not good) and outputs the band selection signal e to change the selected pass band of the bandpass device 21. Band selection continues until pass band 1 B1 is selected and a good reception state is restored. The reception state evaluation device 24 stops band selection signal output when normal reception is restored (pass band 1 B1 is selected in this case), and stable data transmission unaffected by jammings can be maintained.

Note that while the above embodiment has been described using binary PSK (phase shift keying) modulation as the modulation method of the data modulated signal p(t), 4-ary PSK, 8-ary PSK, or other multilevel PSK modulation method can be used. The above embodiment will be modified in this case as follows: the differential detector 22 must be a two channel design with an orthogonal axis added, and the decoder 23 outputs bit series decoded data $d'_m$ by parallel-serial conversion after the detector output c is evaluated and the evaluated symbol data is input to the decoder 23 (cf., William R. Bennet and James R. Davey, "DATA TRANSMISSION" 1965 by McGraw-Hill Book Co., New York).

It should also be noted that the invention shall not be limited to PSK modulation, and other modulation methods, including amplitude shift keying (ASK) modulation can be used.

In addition, while differential detection is applied by the differential detector 22, other detection methods can be used. For example, envelope detection using the data modulated signal p as an ASK signal can be used. When a detection method other than differential detection is used, e.g., envelope detection, the spreading signal q period can be set irrespective of the symbol period T of the data modulated signal p. In addition, the frequency of the local oscillation signal in the bandpass device 21b shown in FIG. 5 can be changed to any other frequency without being limited to an interval that is an integer multiple of 1/T.

Figure 12:
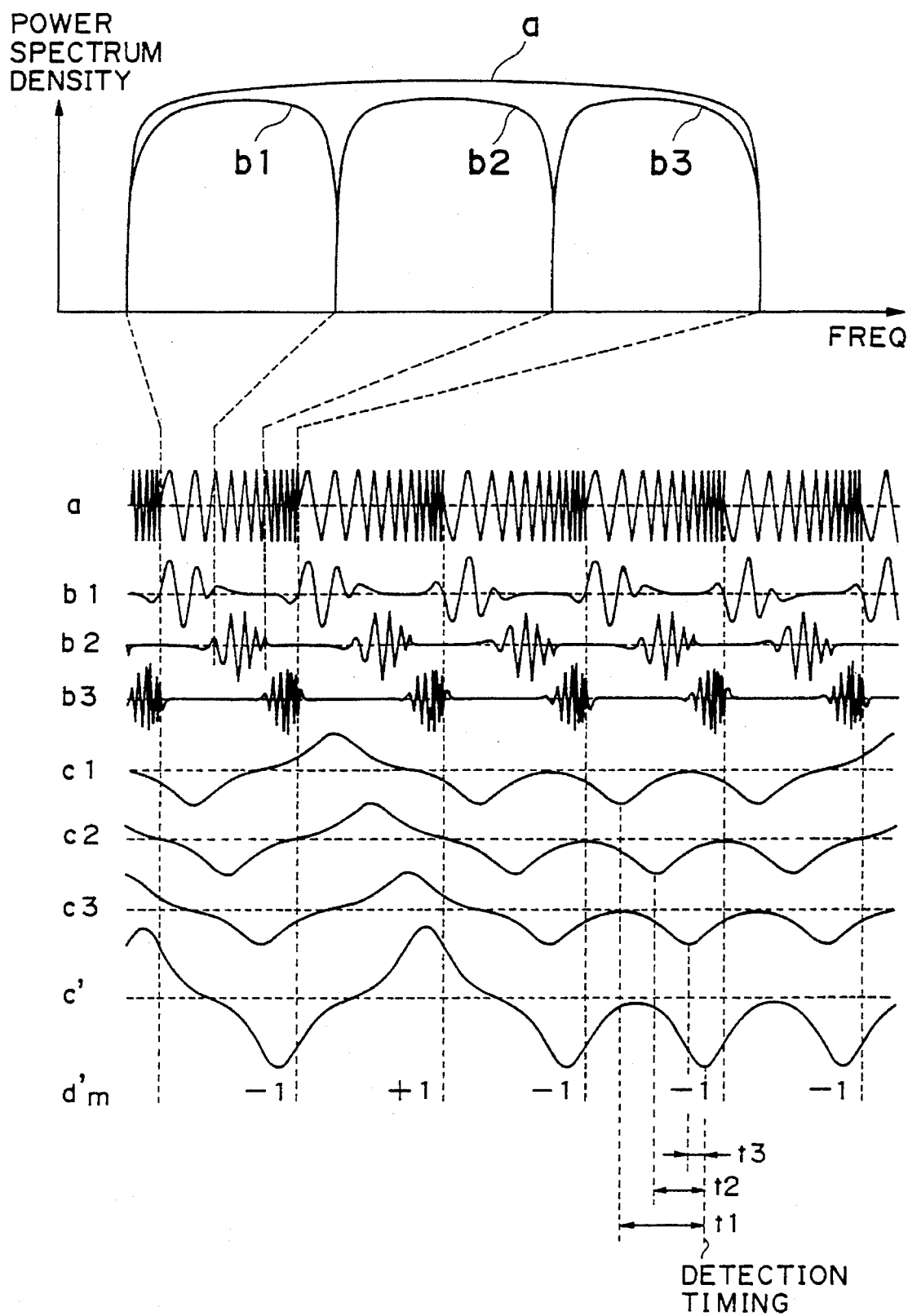
FIG. 12 is a spectrum diagram and waveform diagram of signals in the receiver of the fourth embodiment, FIGS. 13a and 13b taken together as shown in FIG. 13 is a block diagram of a data transmitting and receiving apparatus according to a fifth embodiment of the invention.

The spreading signal q(t) is also not limited to the constant amplitude, pseudorandom pulse wave generated by the pseudorandom series as described above, and another noise-like signal or chirp signal as described with reference to the fourth embodiment below can be used. When a chirp signal is used for the spreading signal q(t), the energy of a specific frequency component tends to concentrate in a specific position in each symbol period. As a result, the intermediate signal b(t) bandwidth limited by the bandpass device 21 becomes a pulse with a high peak at a specific position in each symbol period as shown in FIG. 12, and intersymbol interference is not as easily generated.

The spreading signal q(t) period is also described as equal to the symbol period T of the data modulated signal p(t) above, but a period that is 1/n (where n is a natural number) of the symbol period T can be used. Alternatively, the spreading signal q(t) period can be n times (where n is a natural number) the symbol period T if the delay 221 has a delay time that is also n times the symbol period T.

Figure 2:
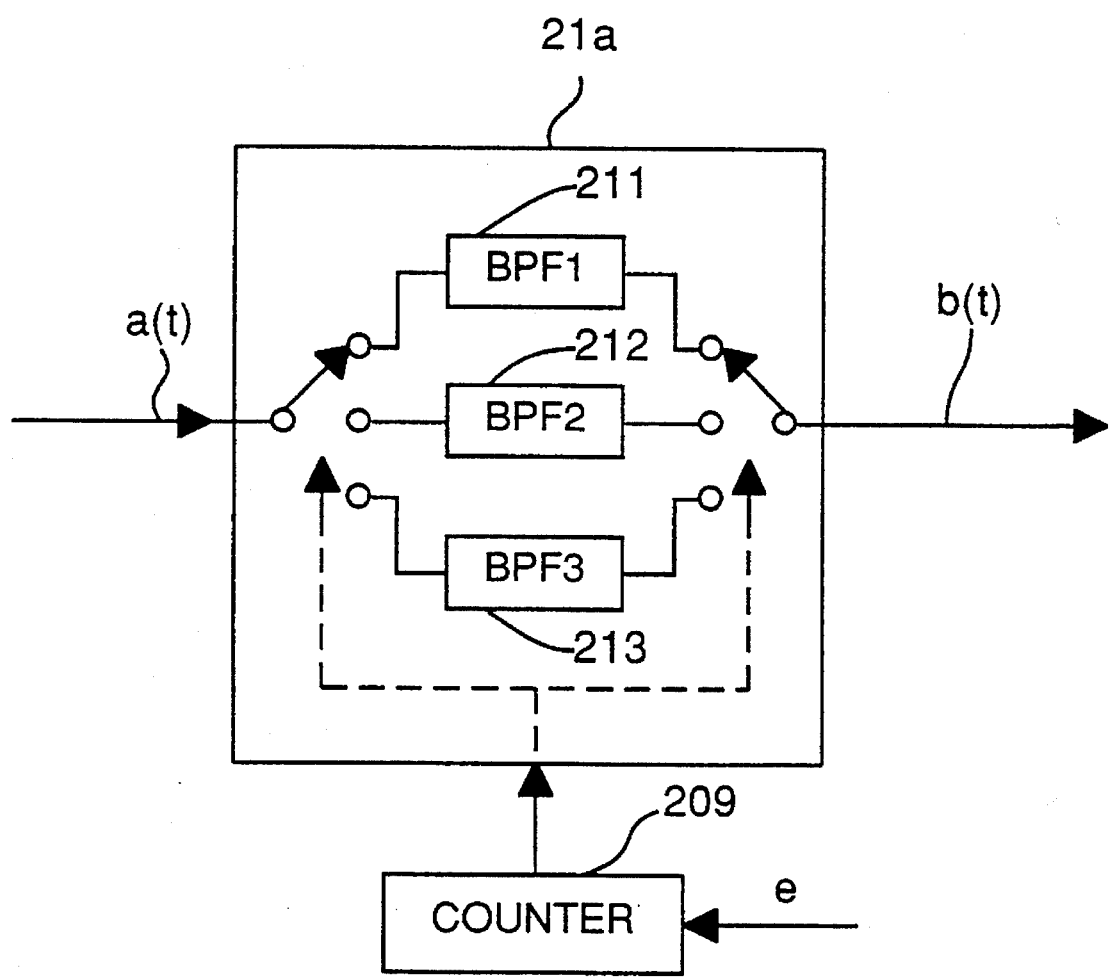
FIG. 2 is a block diagram of the bandpass device of the first embodiment.

The bandpass device 21 is furthermore not limited to the configurations shown in FIGS. 2 and 5, and the pass band characteristics thereof can be changed. For example, the pass band characteristics can be changed by changing the parameters of a single filter. Alternatively, plural local oscillators each generating a local oscillation signal at a different frequency can be provided and selected rather than changing the oscillation frequency of the one local oscillator shown in FIG. 5.

While this bandpass device 21 selects from three pass bands, a number other than three pass bands can also be used.

The reception state evaluation device 24 is described as monitoring the detector output c level, but may monitor any other parameter(s) enabling evaluation of the reception state. For example, the aperture of the eye pattern of the detector output or the error rate of the decoded data $d'_m$ can be monitored.

Figure 7:
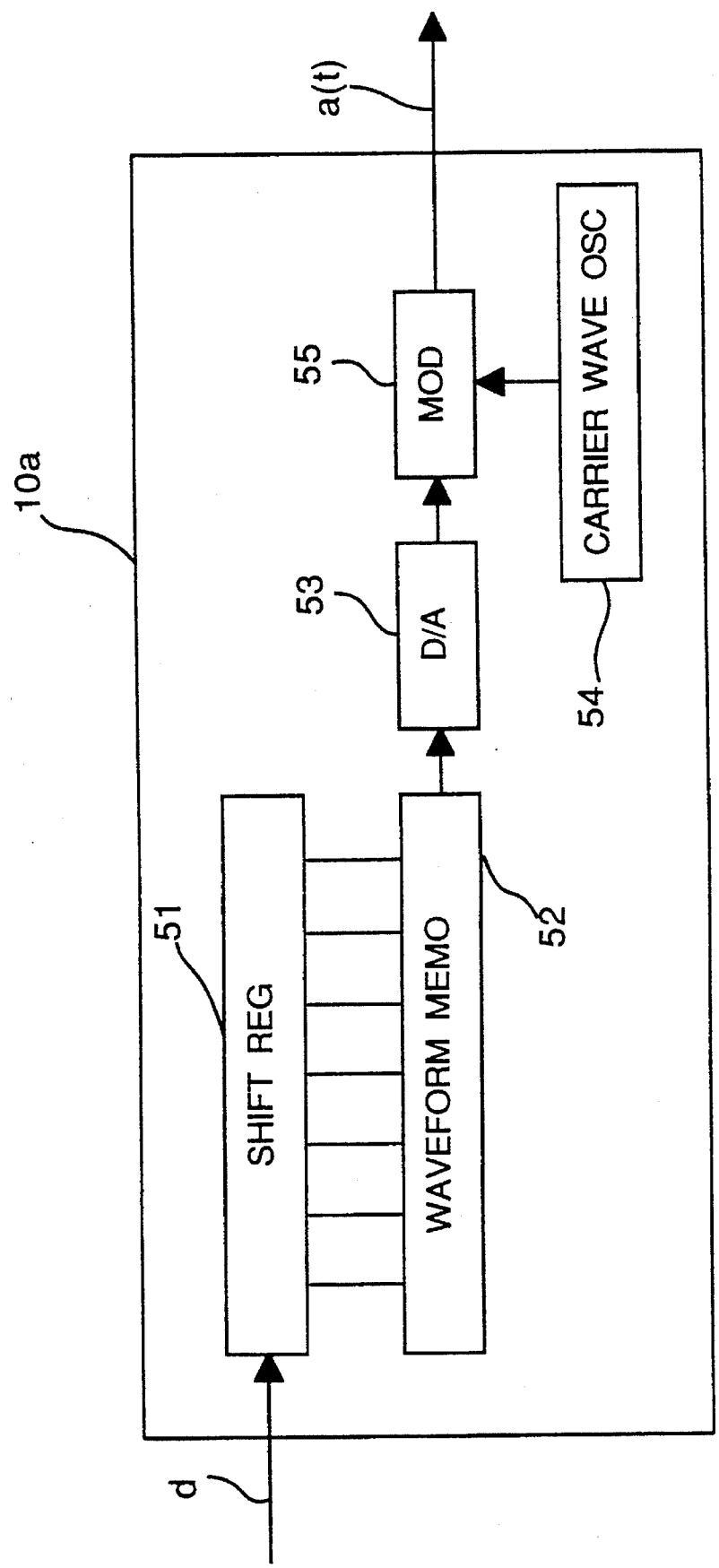
FIG. 7 is a block diagram of a modification of the transmitter in the first embodiment.

The transmitter 10 is also not limited to that shown in FIG. 1, and a transmitter 10a comprising a shift register 51, waveform memory 52, D/A converter 53, carrier wave oscillator 54, and modulator 55 as shown in FIG. 7 can be used. The operation of the transmitter shown in FIG. 7 is described below.

The bit stream data d is input to a k stage (where k is a natural number) shift register 51, and supplied as k-bit serial data to the address input of the waveform memory 52. The waveform memory 52 is a read-only memory (ROM) device storing as waveform data the precalculated baseband waveforms of the spread spectrum signals determined by the patterns of all k-bits of data d. This waveform data is stored to the address expressed as a k-bit pattern, and is output from the address specified by the shift register 51 output. The D/A converter 53 converts the waveform data to an analog wave, and outputs the result as the spread spectrum signal baseband wave. The carrier wave oscillator 54 oscillates and outputs the carrier wave. The modulator 55 product modulates the carrier wave using the spread spectrum signal baseband wave to obtain the spread spectrum signal a(t). This transmitter 10a generates and transmits the same spread spectrum signal a(t) as that obtained by the transmitter 10 shown in FIG. 1.

Figure 8:
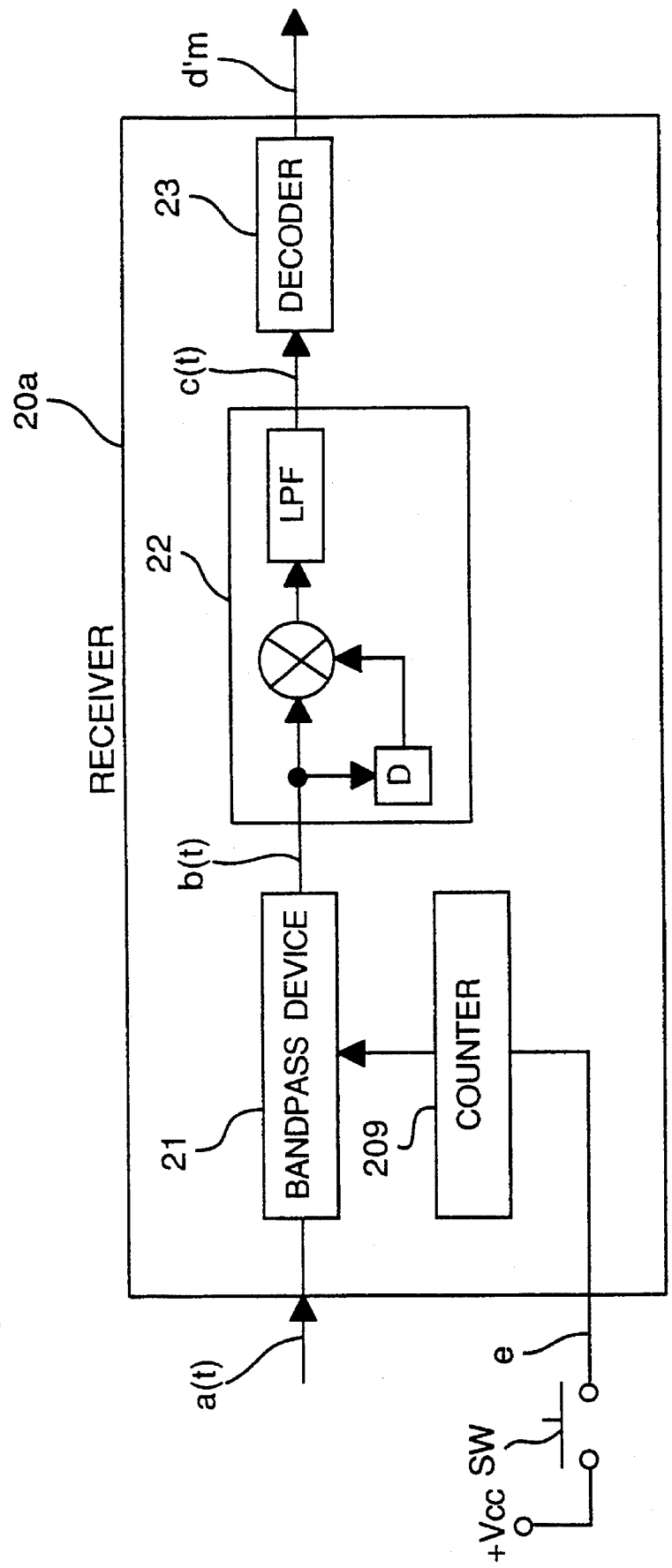
FIG. 8 is a block diagram of a data receiver according to a second embodiment of the invention.

FIG. 8 is a block diagram of a receiver in a data transmitting and receiving apparatus according to a second embodiment of the invention. Further description of the transmitter 10 in this embodiment is omitted below because it is the same as that of the first embodiment (FIG. 1). The receiver 20a in this embodiment is essentially identical to the receiver 20 of the first embodiment except that this receiver 20a does not have a reception state evaluation device, but has a manually operable switch SW from which the band selection signal e is externally applied to the bandpass device 21.

Specifically, decoding data is processed by an external device connected to the receiver and using the decoding data thereof. The result returned by the external device is used to automatically supply an effective band selection signal, or band selection is manually controlled for more precise band selection.

Figure 9:
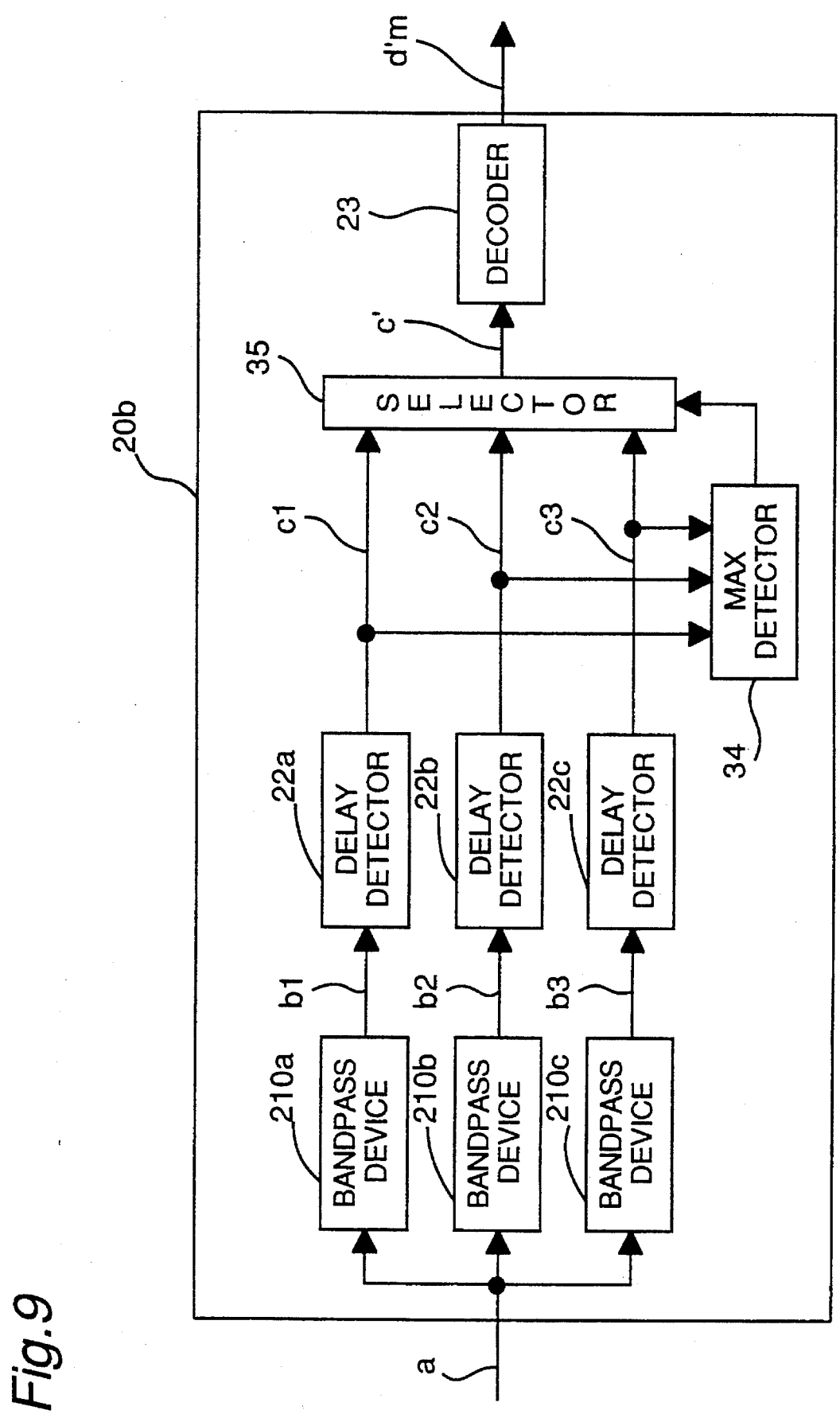
FIG. 9 is a block diagram of a data receiver according to a third embodiment of the invention.

FIG. 9 is a block diagram of a receiver in a data transmitting and receiving apparatus according to a third embodiment of the invention. Further description of the transmitter 10 in this embodiment is omitted below because it is the same as that of the first embodiment (FIG. 1). In the receiver 20b shown in FIG. 9, the first, second, and third bandpass device 210a, 210b, and 210c are the same as bandpass filters 211, 212, 213 in the first embodiment, respectively. The spread spectrum signal a is bandwidth limited to pass band 1 B1, pass band 2 B2, and pass band 3 B3, respectively, resulting in first, second, and third intermediate signals b1, b2, and b3. The spectra of these intermediate signals are as shown in FIG. 4b with reference to the first embodiment above. The first, second, and third differential detectors 22a, 22b, and 22c delay detect the first, second, and third intermediate signals b1, b2, and b3, respectively, to output corresponding first, second, and third detector outputs c1, c2, and c3. The configuration and operation of each of the differential detectors 22a–22c are the same as that of the differential detector 22 shown in FIG. 1 with reference to the first embodiment.

These detector outputs c1, c2, and c3 are input to the optimum band evaluation device 34, which monitors the level of each input to determine which of the detector outputs c1–c3 is in the best reception state. The optimum band evaluation device 34 is formed by a maximum detector 34 for detecting the maximum level of the three outputs c1–c3. The result is output to the detector output selector 35. Based on this reception state signal, the detector output selector 35 selects one of the detector outputs c1–c3 which has the maximum output level, and outputs the selected signal as the detector output c to the decoder 23. The decoder 23 evaluates the data as described in the first embodiment above, and outputs the decoded data $d'_m$.

In this embodiment, the three intermediate signals b1–b3 obtained by the three bandpass device 210a–210c are simultaneously detected to obtain three detector outputs c1–c3, of which the best signal is selected. The time required for sequential bandwidth selection in the first embodiment is therefore not needed in this embodiment. In addition, when the reception state varies over time it is possible to select another bandwidth before reception becomes impossible due to a deteriorated reception state, and interruption of data receiving can be prevented.

The three bandpass device 210a–210c of this embodiment may be configured to change the pass band by means of a construction similar to the bandpass device 21a shown in FIG. 2 or the bandpass device 21b shown in FIG. 5 and described in the first embodiment above. Furthermore, if the bandpass device 210a–210c comprise a frequency mixer, local oscillator, and bandpass filter identically to the bandpass device 21b shown in FIG. 5, the frequency interval of each local oscillator is an integer multiple of 1/T, and the center frequency of the intermediate signals b1–b3 is identically selected, identical structures can be used for the same differential detectors 22a–22c.

Figure 10:
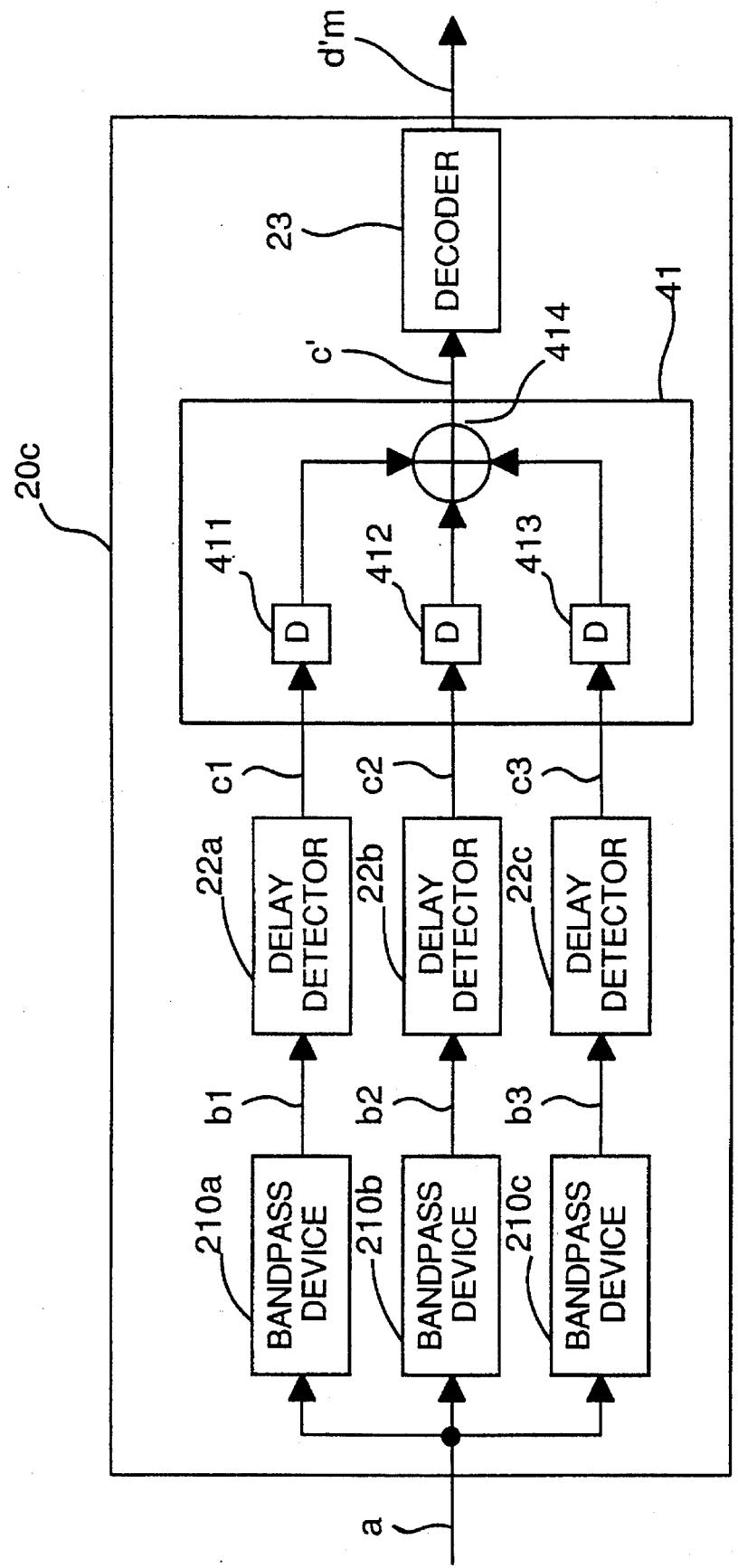
FIG. 10 is a block diagram of a data receiver according to a fourth embodiment of the invention.
Figure 11:
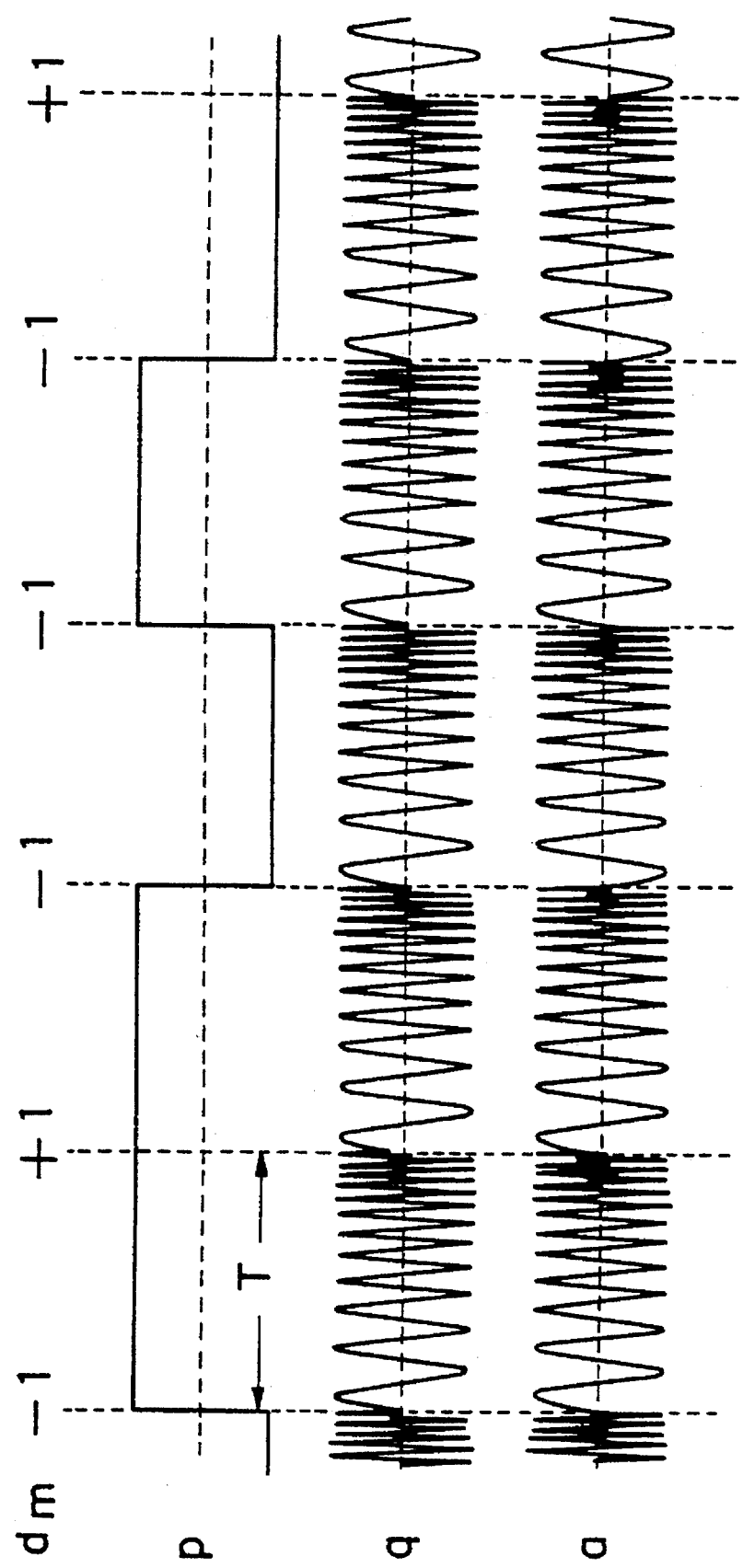
FIG. 11 is a waveform diagram of signals in the transmitter of the fourth embodiment.

FIG. 10 is a block diagram of a receiver in a data transmitting and receiving apparatus according to a fourth embodiment of the invention. The transmitter 10 in this embodiment is the same as that of the first embodiment (FIG. 1). FIG. 11 is a waveform diagram of selected signals in the transmitter, and FIG. 12 shows a spectrum diagram of the intermediate signals and waveform diagram of selected signals in the receiver of the fourth embodiment.

The modulation process of this embodiment is essentially identical to that of the first embodiment described with reference to FIG. 3a. As shown in FIG. 11, however, the spreading signal q output by the spreading signal generator 13 is a chirp signal obtained by frequency modulation of a sine wave signal. The period of this signal is equal to the symbol period T of the data modulated signal p.

The first, second, and third bandpass device 210a, 210b, and 210c of the receiver 20 shown in FIG. 10 are identical to the bandpass device of the third embodiment shown in FIG. 9; the spread spectrum signal a is bandwidth limited to pass bands B1–B3, and the first, second, and third intermediate signals b1, b2, and b3 shown in FIG. 12 are respectively output. The first, second, and third differential detectors 22a, 22b, and 22c are identical to the differential detectors of the third embodiment shown in FIG. 9; the first, second, and third intermediate signals b1, b2, and b3 are delay detected, resulting in corresponding first, second, and third detector outputs c1, c2, and c3, respectively.

As shown in FIG. 12, the first part of each symbol period is a low frequency component with the frequency gradually increasing to a high frequency component at the end of each symbol period because the spread spectrum signal a is a chirp signal. Because intermediate signal b1 is obtained by extracting the low frequency component of the original spread spectrum signal a, intermediate signal b1 starts as a high amplitude signal early in each symbol period and diminishes to a low amplitude signal at the end of each symbol period. Conversely, intermediate signal b3 is obtained by extracting the high frequency component of the original spread spectrum signal a, and therefore starts each symbol period with a low amplitude and ends each period as a high amplitude signal. Intermediate signal b2 has a high amplitude in the middle of each symbol period and a low amplitude at the beginning and end of each period. As with the intermediate signal b of the first embodiment above, however, the shape of each signal is essentially the same in each symbol period and the symbol inverts according to the data modulated signal, thus enabling demodulation by differential detection. As shown in FIG. 12, the detector outputs c1–c3 are pulse streams with a peak at a specific position in each symbol period, and the pulse peaks are located at the beginning, middle, and end of each symbol period. The peak positions are determined by the spreading signal q frequency sweep parameters and the characteristics of each bandpass device.

The detector output synthesizer 41 comprises first, second, and third detector output delay device 411, 412, and 413. The first detector output c1 is input to the first detector output delay device 411 and delayed time t1, the second detector output c2 is input to the second detector output delay device 412 and delayed time t2, and the third detector output c3 is input to the third detector output delay device 413 and delayed time t3. Note that times t1–t3 are equal to the difference between the detector output c1–c3 pulse peak positions and the evaluation timing as shown in FIG. 12. After thus adjusting the peak position of each detector output to the evaluation timing, the signals are added by the adder 414 to obtain synthesized detector output c. The decoder 23 decodes the data based on the symbol of the detector output at this evaluation timing, and outputs decoded data $d'_m$.

All signal components contained in each intermediate signal can be used in this embodiment because all plural intermediate signals are detected and synthesized. A higher signal/noise (S/N) ratio can therefore be obtained in the detector output, and reliable transmission is possible even with high noise levels. The energy of each intermediate signal is also concentrated at a specific position in each symbol period, and intersymbol interference can be effectively reduced by using a chirp signal for the spreading signal. The detector outputs can also be efficiently synthesized because each of the detector outputs c1–c3 has a high peak at a specific position in each symbol period and the peak positions of each detector output input to the detector output synthesizer 41 are aligned.

Note that if the pulse peak position of the third detection signal c3 is adjusted to the evaluation timing, time t3 can be defined as zero (0) and the third detector output delay device 413 can be eliminated in this fourth embodiment. While the adder 414 of the detector output synthesizer 41 simply adds the inputs, the inputs can also be weighted according to the reception state of each detector output, thereby further improving the S/N ratio of the synthesized detector output c'.

As in the third embodiment, the three bandpass device 210a–210c of this embodiment may be configured similarly to the bandpass device 21a shown in FIG. 2 or the bandpass device 21b shown in FIG. 5. Furthermore, if the bandpass device 210a–210c are identical to the bandpass device 21b shown in FIG. 5, the frequency interval of each local oscillator is an integer multiple of 1/T, and the center frequency of the intermediate signals b1–b3 is identically selected, identical structures can be used for the differential detectors 22a–22c.

Figure 13B:
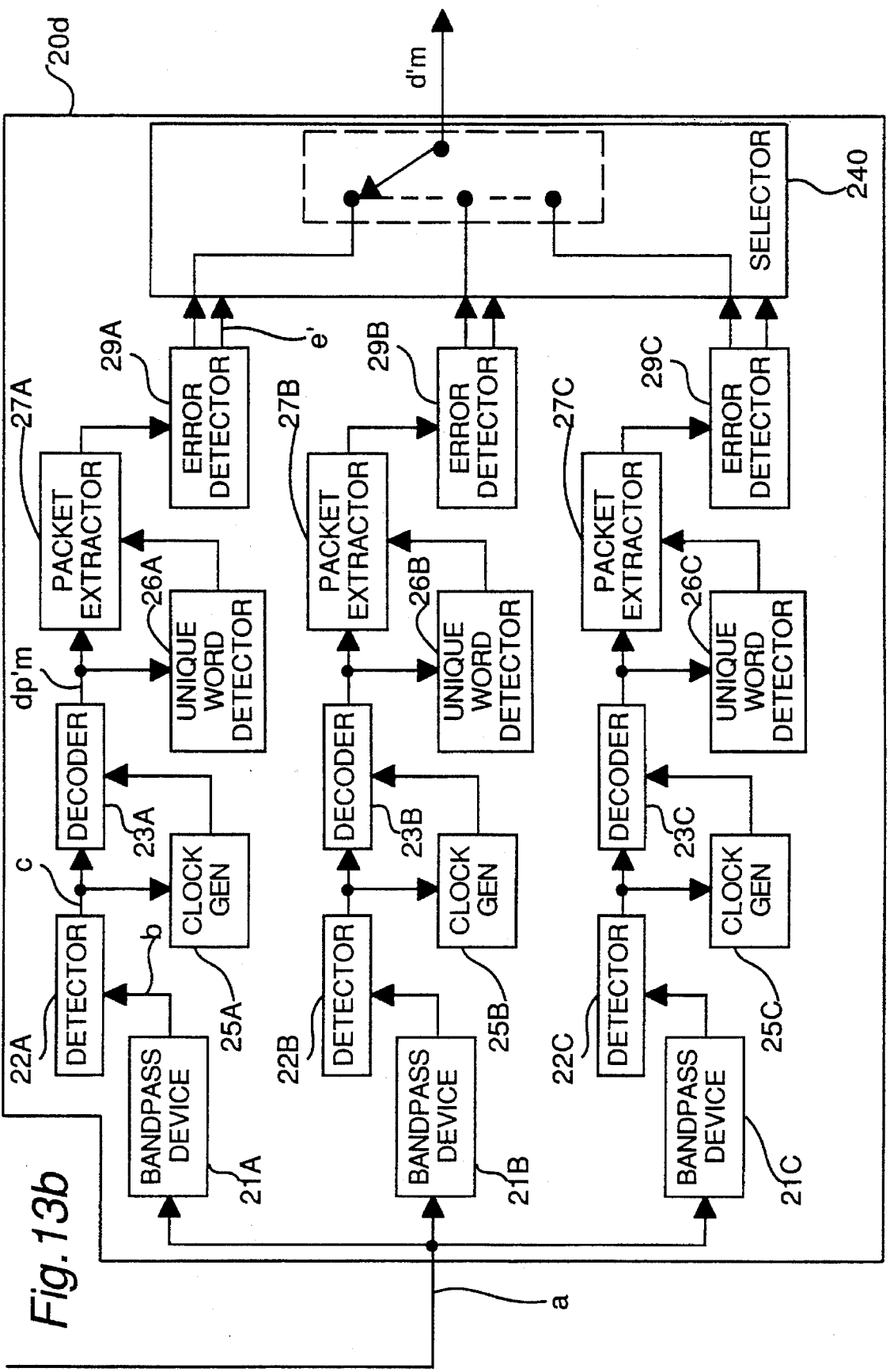

FIGS. 13a and 13b taken together show a block diagram of a data transmitting and receiving apparatus according to a fifth embodiment of the invention. As shown in FIG. 13, the transmitter 10b comprises a packet assembler 16, a data modulator 17, multiplier 14, clock generator 15, and spreading signal generator 13 which outputs the spread spectrum signal a. The receiver 20d comprises bandpass devices 21A, 21B and 21C, differential detectors 22A, 22B and 22C, decoders 23A, 23B and 23C, clock regenerators 25A, 25B and 25C, unique word detectors 26A, 26B and 26C, packet extractors 27A, 27B and 27C, error detectors 29A, 29B and 29C, and evaluator/selector 240.

Note that the data modulator 17 in the transmitter 10b comprises both the differential encoder 11 and PSK modulator 12 provided separately in the transmitter 10 of the first embodiment shown in FIG. 1. Also, the receiver 20d in FIG. 13 has three detection units for three different channels A, B and C, the first, second and third detection units are defined by elements with suffixes "A", "B" and "C", respectively. The bandpass devices 21A, 21B and 21C are arranged to selectively pass three different pass bands B1, B2, and B3, respectively, which are also referred to as channels A, B and C.

Figure 14:
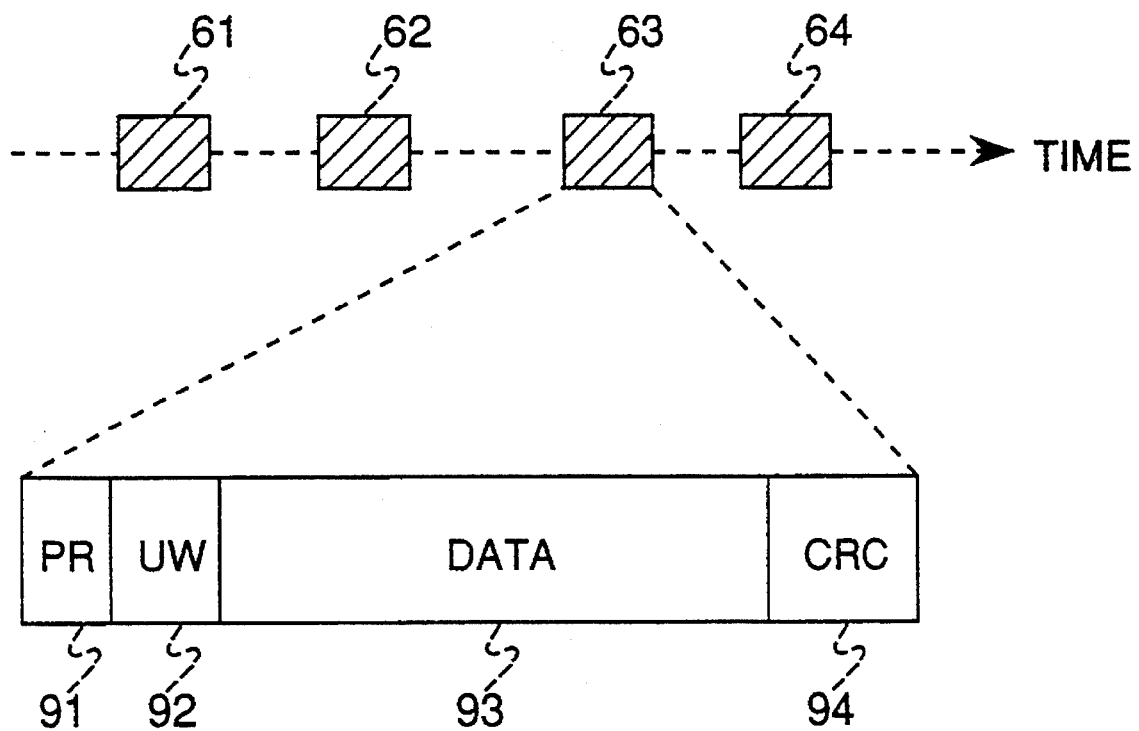
FIG. 14 is a diagram showing the code structure of the data packet in this embodiment.
Figure 15A:
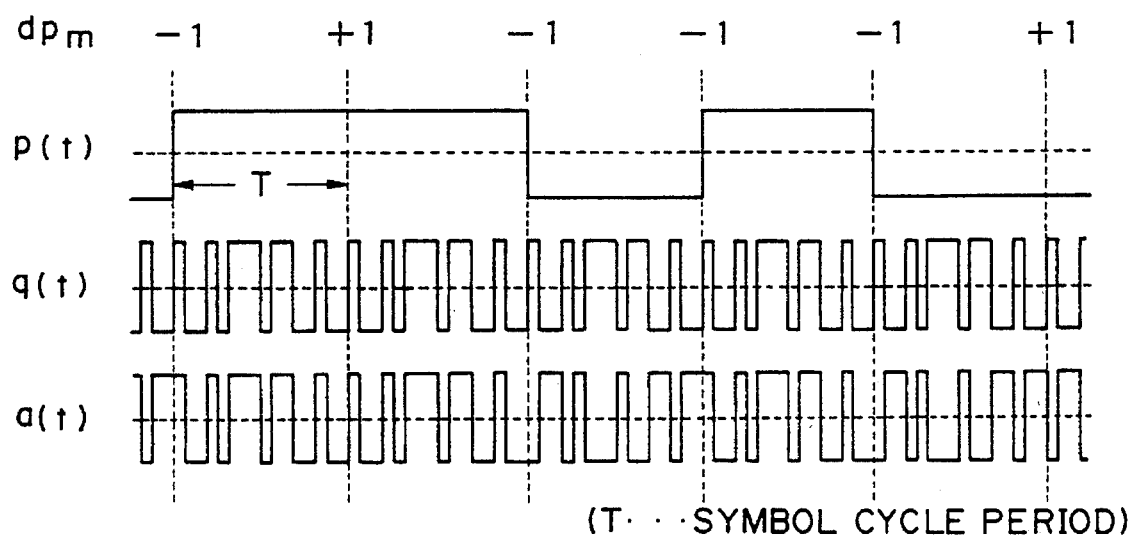
FIGS. 15a and 15b are a waveform diagram of the signals obtained at various points of the transmitter and receiver in this embodiment.
Figure 15B:
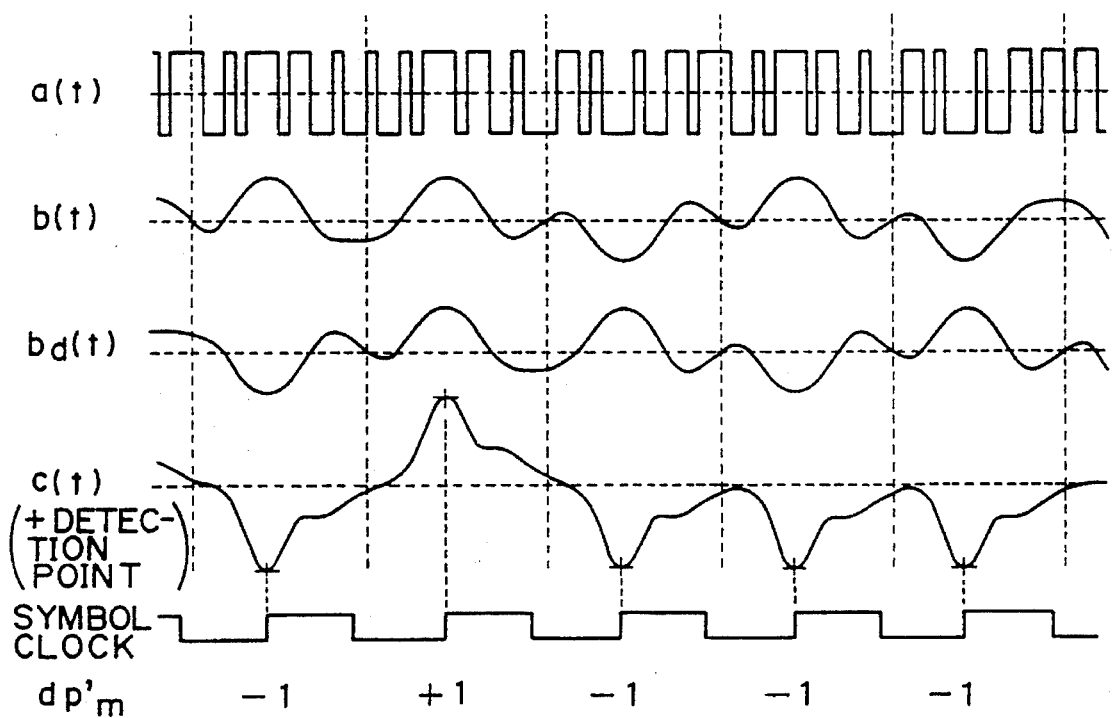
Figure 16:
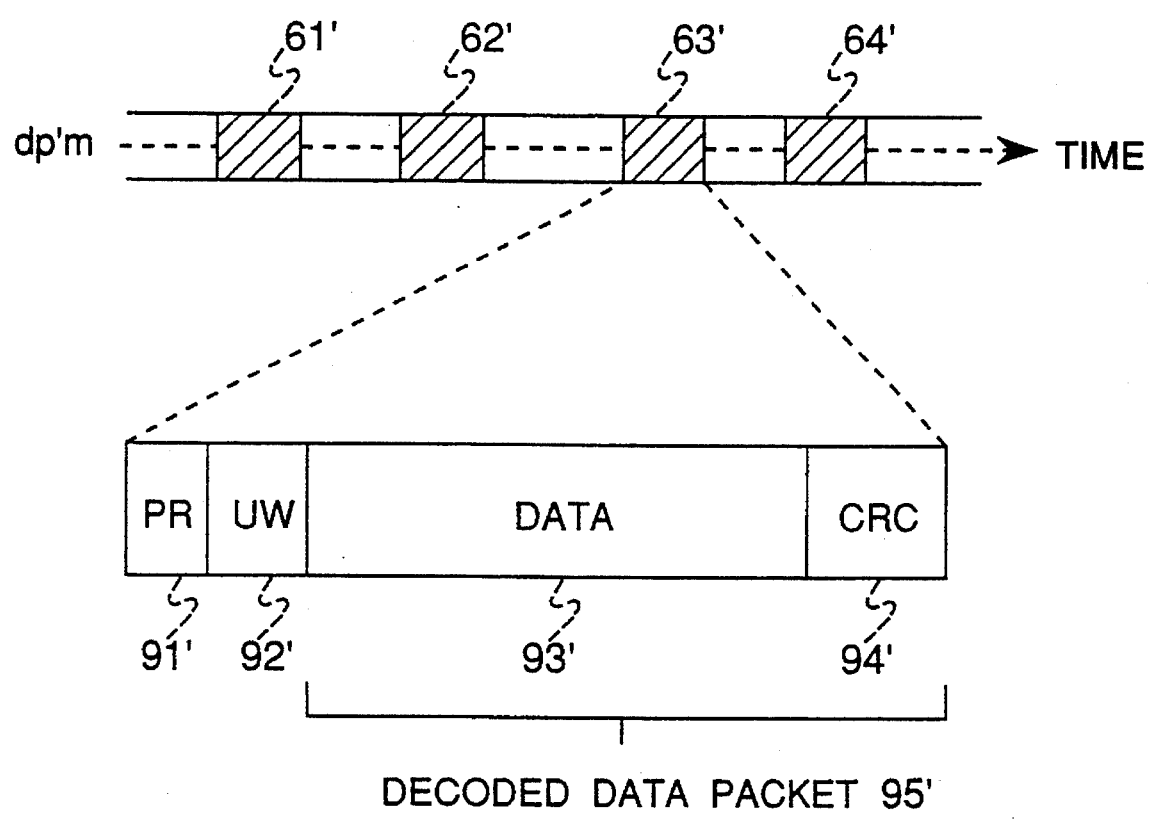
FIG. 16 is a diagram showing the structure of the data packet observed in the evaluated data stream in this embodiment.
Figure 17A:
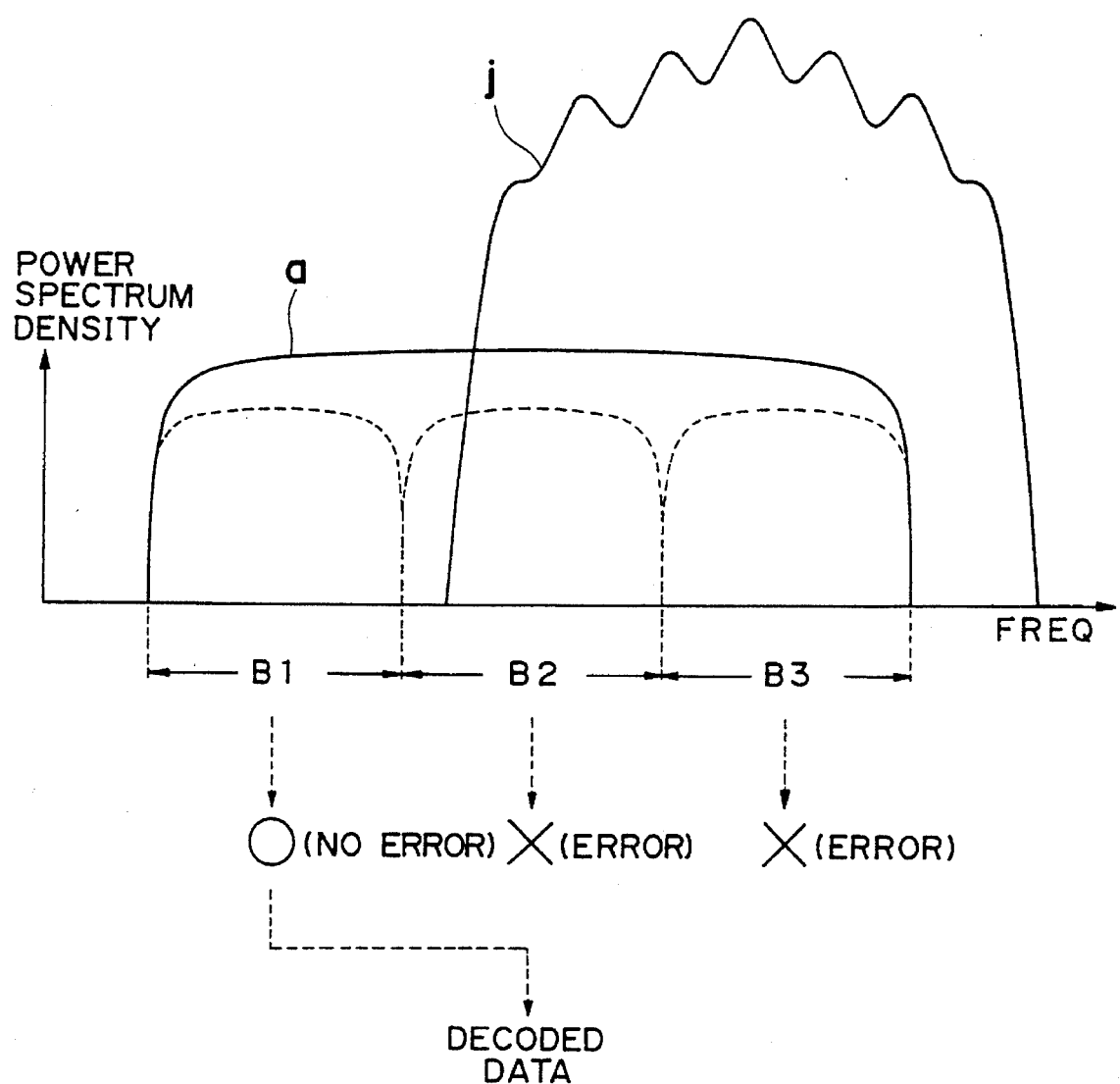
FIG. 17a is a spectrum diagram and waveform diagram of signals in the receiver of the fifth embodiment.

The operation of this embodiment is described below with further reference to FIGS. 14, 15a, 15b, 16 and 17a, in which FIG. 14 shows the code format of the data packets output from the packet assembler 16, FIGS. 15a and 15b show the waveform diagrams of various signals (baseband waves shown for simplicity) from the circuit of FIG. 13, FIG. 16 shows the data packets observed in the evaluated data stream output from the decoders 23A, 23B and 23C, and FIG. 17a show the wave spectrum diagram.

The configuration and operation of the transmitter 10b shown in FIG. 13 is essentially identical to that of the first embodiment transmitter 10 shown in FIG. 1, but differs in that a packet assembler 16 for generating transmission data packets is further provided. Also, according to the transmitter 10b of FIG. 13, the transmission data is presented in packets, and the spread spectrum signal a corresponding to each packet is in a form of a burst signal. More specifically, the transmission data is first divided into data blocks of information bits 93 (FIG. 14), each block containing a predetermined number of bits. A preamble 91, unique word 92, and error detection bits 94 are then added to each data block of information bits 93 to form the data packets 61–64. These data packets 61–64 are input to the data modulator 17, which outputs the data modulated signals in bursts corresponding to each packet. A (differential) PSK method using binary, 4-ary, or 8-ary PSK (or another number of phases) is used for the data modulation method. The basic configuration and operation of the data modulator 17 are identical to the configuration and operation of the differential encoder 11 and PSK modulator 12 shown in FIG. 1 of the first embodiment. Note that the data modulator 17 may also add a ramp wave with a smooth envelope at the beginning and end of each burst because the sudden rise and fall of each burst expands the width of the transmission signal spectrum. As in the first embodiment, the data modulated signal p is multiplied by the spreading signal q, and the spread spectrum signal a is output from the transmitter 10b in bursts corresponding to each packet.

As will be described below, the unique word 92 is a fixed bit pattern string inserted to identify the corresponding data block of information bits 93 during the decoding operation of the receiver 20d. The error detection bits 94 are variable bit patterns inserted for the receiver 20d to determine whether there is a bit error in the information bits 93 or in the error detection bits 94 itself. In practice, a parity code or CRC (cyclic redundancy check) code is used for the error detection bits 94.

The operation of this embodiment is further described below starting with the transmitter 10b and using binary PSK modulation as the data modulation method.

The $m^{th}$ data $dp_m$ (a binary value of ±1) bit in the data packets 61–64 output from the packet assembler 16 is read synchronously to the symbol clock CK of period T output from the clock generator 15, and differentially coded and then modulated by the differential encoder 11 and PSK modulator 12 of the data modulator 17. The PSK modulator 12 output is thus a binary PSK modulated signal of symbol period T, and is input to the multiplier 14 as the data modulated signal p. The spreading signal generator 13 generates a spreading signal q synchronized to and with the same period as the symbol clock CK. The spreading signal q is, for example, a constant amplitude, pseudorandom pulse wave generated from pseudorandom series. The multiplier 14 multiplies the data modulated signal p and spreading signal q to output the spread spectrum signal a.

The spread spectrum signal a is input through the transmission path to the receiver 20d, and bandwidth limited by the bandpass devices 21A, 21B or 21C to obtain the intermediate signal b. FIG. 17a shows the spectrum of the received spread spectrum signal a and the pass bands B1, B2 and B3 of the bandpass devices 21A, 21B and 21C, respectively. Note that the number of pass bands shall not be limited to three as shown in FIG. 17a, and two or more plural bands can be used. Any plural number of bandpass device 21A can also be used.

The intermediate signals b are then detected by the differential detectors 22A, 22B and 22C, obtaining detector outputs c. These differential detectors 22A, 22B and 22C are the same, for example, as the differential detector 22 of the first embodiment. The process whereby the intermediate signals are detected by the corresponding differential detectors is the same as that of the first embodiment, and the data is decoded by evaluating the polarity of the detector output c.

This detection process is illustrated in FIG. 15b. Specifically, same (or similar) wave pulses are multiplied resulting in a positive pulse when there is no phase change from the preceding wave symbol, but a negative pulse results when the phase is reversed from that of the previous wave symbol because opposite-symbol pulses are multiplied. As a result, detector output c will become a positive or negative pulse depending upon whether the waves are of same or opposite phase. The clock regenerators 25A, 25B and 25C produce the regenerated symbol clock from the detector output c. Using this timing, the decoders 23A, 23B and 23C sequentially sample/recognize the detector output c, determine the polarity of the symbol at the sampling point, and output the evaluated data $dp'_m$ as a value of 1 or −1 when the detector output c is positive or negative, respectively.

Note that while the above embodiment has been described using the binary PSK modulation, 4-ary PSK, 8-ary PSK, or other multilevel phase modulation method can be used.

The evaluated data stream contains data packets 61'–64' (FIG. 16) corresponding to the data packets 61–64 shown in FIG. 14 and identically formatted. The unique word detectors 26A, 26B and 26C are previously stored with the unique word and compare the unique word detected from the evaluated data $dp'_m$ with the previously stored unique word. When the detected and the stored unique words match, the unique word detector produces a frame signal to the corresponding packet extractor 27A, 27B or 27C. Based on the timing of this frame signal, the packet extractors 27A, 27B and 27C extract the data packet 95' comprising a data block of information bits 93' and error detection bits 94', and forward the packet to the error detectors 29A, 29B and 29B. Based on the corresponding error detection bits 94', the error detectors 29A, 29B and 29C detect errors, if any, in the decoded data packet 95', and output the detection results (error signal e if error is detected) and the data blocks of information bits 93' in the decoded data packets 95' to the evaluator/selector 240. The evaluator/selector 240 selects the data block 93' only for the channels in which no error signal e is produced, and outputs the data blocks 93' as the final decoded data of the receiver 20d.

In this embodiment, there are two possible cases in which each error detector will produce an error signal e. One is when the unique word matching is not successful in the unique word detector, and the other is when the unique word matching is successful in the unique word detector, but some errors are detected in the decoded data packet 95'.

This embodiment is described in further detail below with reference to the operation when a jamming j as shown in FIG. 17a is applied to the transmission path. Normal reception by the conventional apparatus shown in FIG. 26 is not possible because most of the jamming j energy is detected by the differential detector. With the apparatus according to the present embodiment as shown in FIG. 13, however, bandpass device 21A, 21B and 21C pass only pass bands B1, B2 and B3, respectively, of the transmitted spread spectrum signal a. In the example shown in FIG. 17a, since the bandpass device 21A is set to pass band B1, the intermediate signal b input to the detector 22A for that channel A will not be affected by the jamming j, and normal reception is possible and the error detector 29A in that channel A will not detect bit error. The signals in the other channels B and C which are set to pass bands B2 and B3, will be affected by the jamming j causing disturbance in the receiving condition. Thus, in these other channels B and C, the error detectors 29B and 29C will detect bit errors. Thus, the evaluator/selector 240 will select the data block 93' from the bit error-free channel A and output this data block 93' as the decoded data.

Figure 17B:
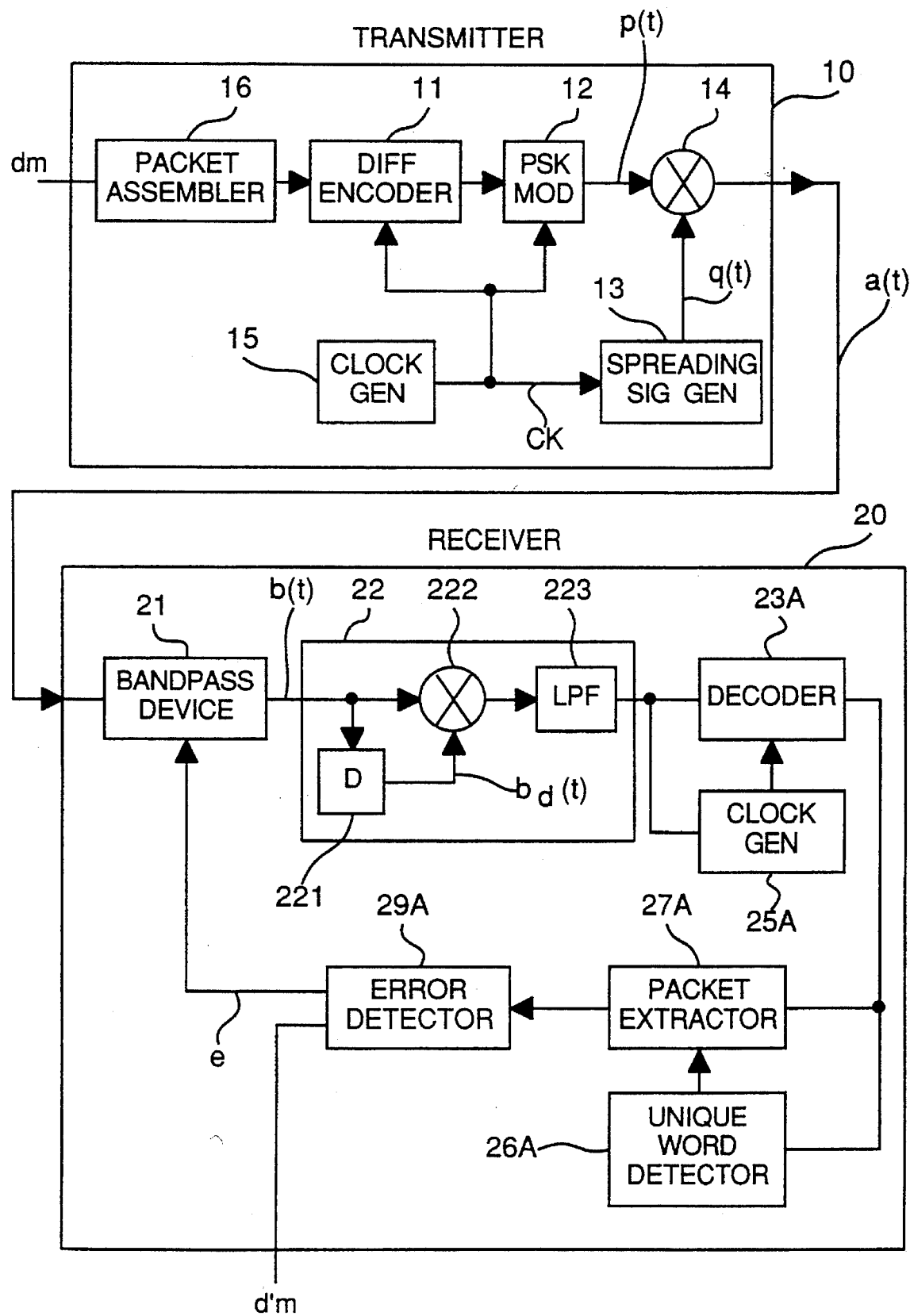
FIG. 17b is a block diagram of a modification of the data receiving apparatus of the fifth embodiment of the invention.

FIG. 17b is a block diagram of a data transmitting and receiving apparatus according to a modification of the fifth embodiment of the invention.

In this modification, instead of three detection units, only one detection unit is provided. Also, the bandpass device 21 is the same as the one used in the first embodiment so that the bandpass device 21 has three bandpass filters which are sequentially selected by the error signal e. Furthermore, no evaluator/selector 240 is provided.

Figure 18:
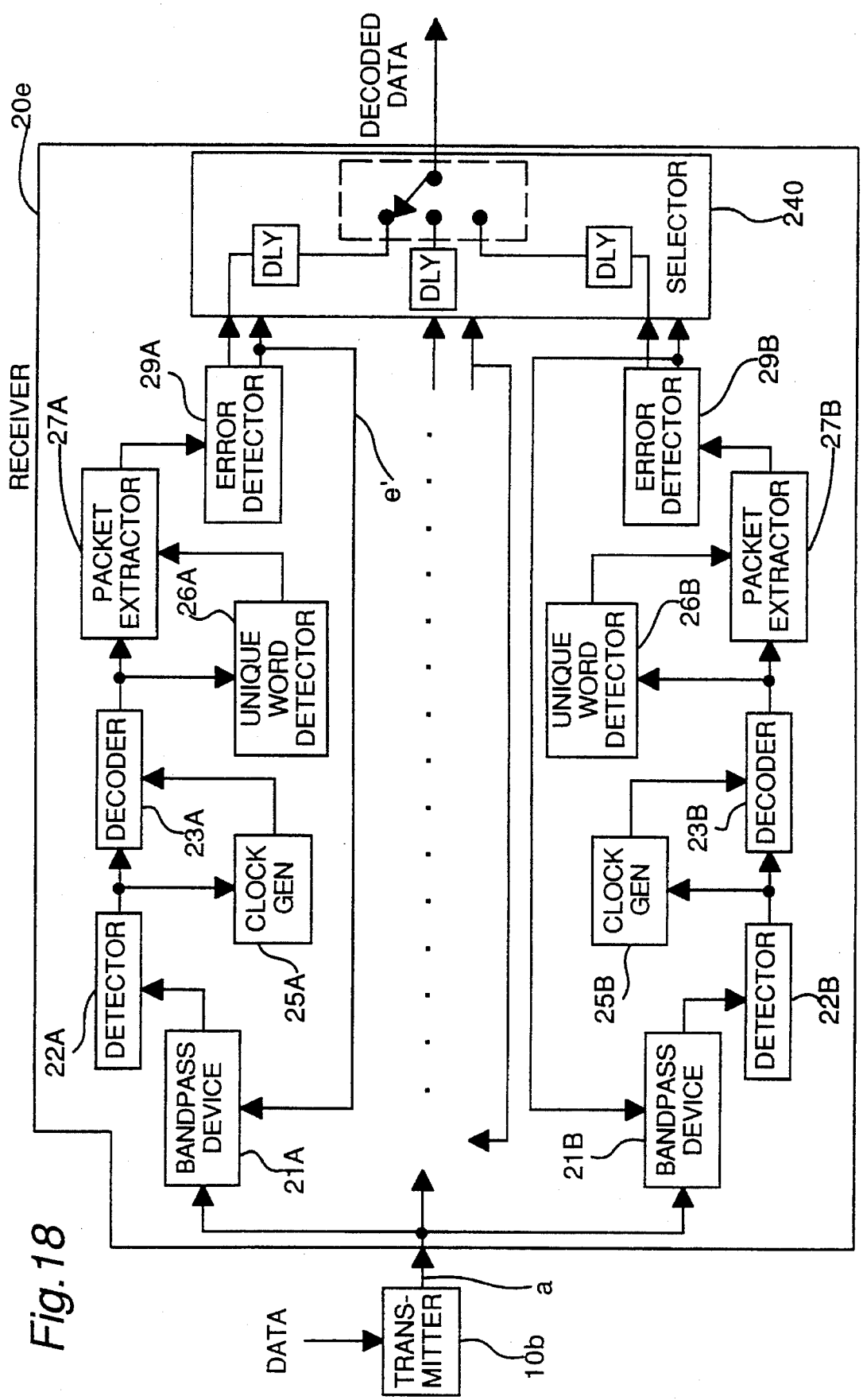
FIG. 18 is a block diagram of a data transmitting and receiving apparatus according to a sixth embodiment of the invention.

FIG. 18 is a block diagram of a data transmitting and receiving apparatus according to a sixth embodiment of the invention. The transmitter 10b in this embodiment is identical to the transmitter 10b of the fifth embodiment shown in FIG. 13. The receiver 20e has two or more channels (two channels are shown in FIG. 18). The configuration and operation of the receiver 20e are essentially identical to those of the receiver 20d in the fifth embodiment, but differs in that the bandpass device 21A and 21B each has the same structure as the bandpass device of the first embodiment. Thus, each bandpass device 21A, 21B has a plurality of, such as three bandpass filters for passing different bands, e.g., B1, B2 and B3, or B1+B2+B3, B1+B2 and B1. Specifically, when any one of the error detectors 29A and 29B detects a bit error and produces an error signal e', the corresponding bandpass device is switched so that the passing band is changed or narrowed, or the center frequency of the passing band is changed, or the passing band is changed or narrowed and at the same time, the center frequency of the passing band is changed.

If the total bandwidth of the combined individual bandwidths of the bandpass means 21A and 21B is only part of the bandwidth of the transmitted spread spectrum signal a, efficient jamming prevention is made possible by changing the pass band of the corresponding bandpass means to a band not used for reception when noise is detected using the bit error detection of the error detectors 29A and 29B. For example, even if there are plural (3 or more) pass bands and there are only two reception channels from the bandpass device 21A and 21B to the error detectors 29A and 29B assigned to two of these plural pass bands, the probability that jamming will interfere with both reception channels simultaneously is low. In addition, when jamming interferes with reception on one channel, that channel can be assigned to the unused band, and efficient jamming prevention can be achieved without greatly increasing the scale of the hardware. Note that the bandpass device 21A and 21B shown in FIG. 18 are configured similarly to the bandpass device 21a shown in FIG. 2 for the first embodiment, for example, and the pass band is changed by selectively choosing from the plural bandpass filters. Note that part or all of the bandpass filters can be shared by part or all of the bandpass device. As in the first embodiment, the bandpass device 21A and 21B can be configured as shown in FIG. 5 to vary the center frequency of the pass bands by varying the frequency of the local oscillation signal.

Note that as the pass band width of the bandpass device 21A and 21B increases, the usable bandwidth of the transmitted spread spectrum signal a increases, and reception sensitivity improves. On the other hand, jamming interference also increases as the pass band width increases. To handle this, the present embodiment can be configured to narrow the pass band width of the corresponding bandpass device when interference is detected using the bit error detection of the error detectors 29A and 29B. With this design, sensitivity can be emphasized when there is no interference, jamming prevention can be emphasized when there is interference, and reception characteristics with good overall balance can be achieved. Note that once the pass band width is narrowed, the noise or jamming source is determined to have disappeared if no bit errors are detected for a predetermined time, and the pass band width is then restored to the full band width.

In this embodiment, it is possible to arrange the bandpass devices 21A and 21B such that bandpass device 21A is provided with an up counter 209a and bandpass device 21B is provided with a down counter 209b so as to avoid selecting the same band simultaneously in both bandpass devices 21A and 21B. If the same band is selected simultaneously in both bandpass devices 21A and 21B, it is possible to advance the band selection in one of the bandpass devices. This can be done by monitoring the counters 209a and 209b.

Alternatively, it is possible to arrange the bandpass devices 21A and 21B such that bandpass device 21A narrows the bandwidth in the steps of B1+B2+B3 → B1+B2 → B1, and bandpass device 21B narrows the bandwidth in the steps of B1+B2+B3 → B2+B3 → B3. Another detection unit may be provided so that its bandpass device narrows the bandwidth in the steps of B1+B2+B3 → B1+B3 → B2.

Figure 19:
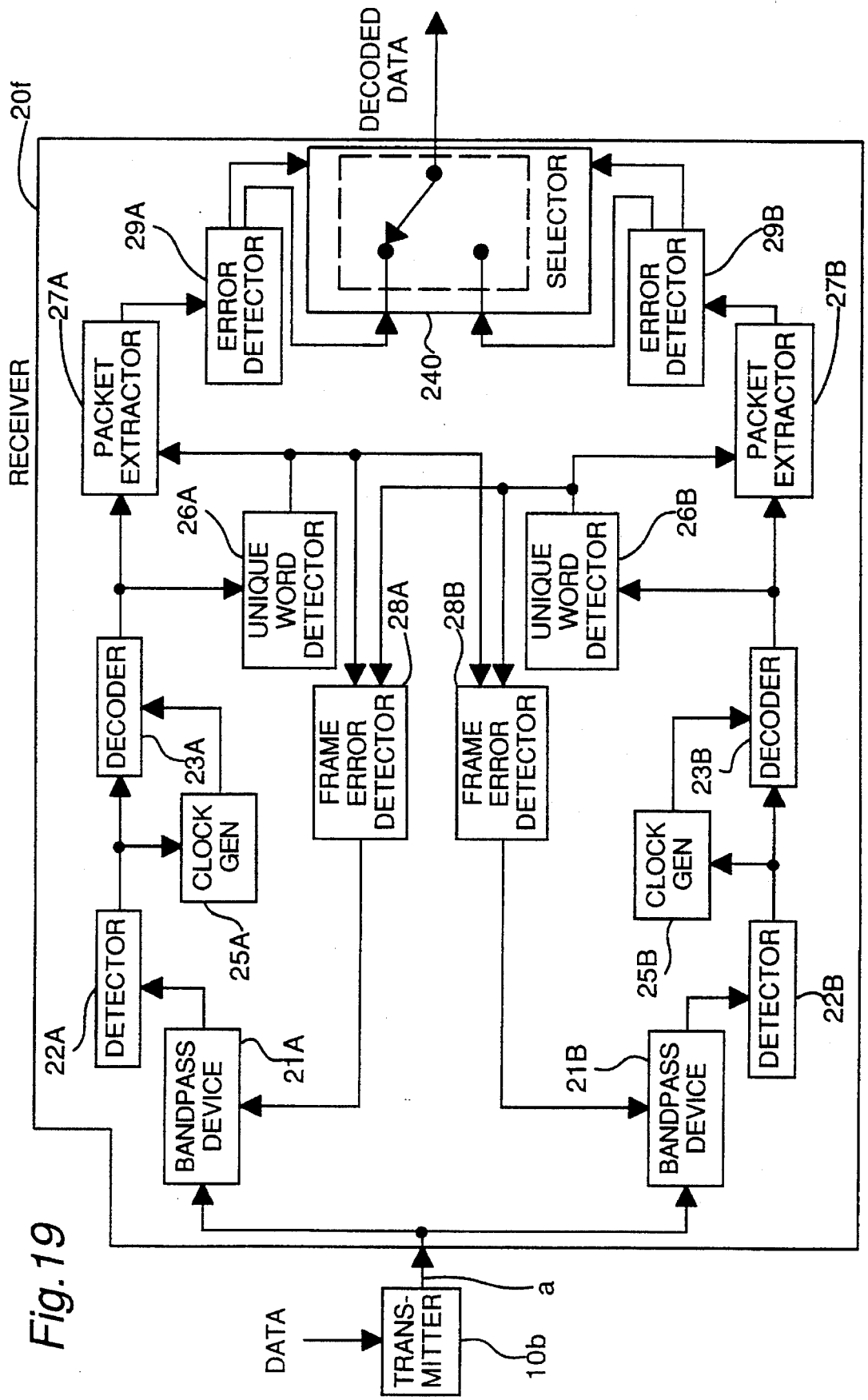
FIG. 19 is a block diagram of a data transmitting and receiving apparatus according to a seventh embodiment of the invention.

FIG. 19 is a block diagram of a data transmitting and receiving apparatus according to a seventh embodiment of the invention. The transmitter 10b in this embodiment is identical to the transmitter 10b of the fifth embodiment shown in FIG. 13. The configuration and operation of the receiver 20f are essentially identical to those of the receiver 20d in the fifth embodiment or the receiver 20e in the sixth embodiment. This receiver 20f differs in that frame error detectors 28A and 28B are added, and the frame error signals output therefrom are used to switch the corresponding bandpass device so that the passing band is changed or narrowed, or the center frequency of the passing band is changed, or the passing band is changed or narrowed and at the same time, the center frequency of the passing band is changed.

Figure 20:
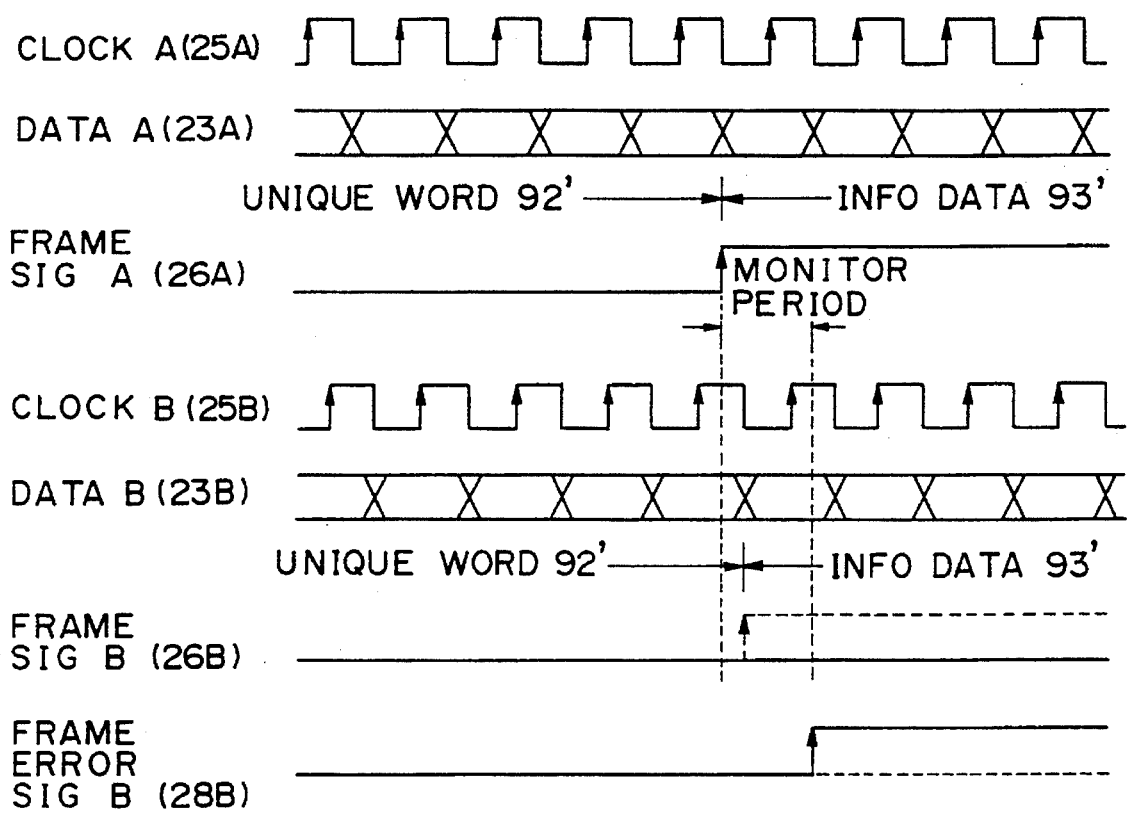
FIG. 20 is a diagram showing the operation of a receiver in the seventh embodiment.

The operation of the receiver 20f of the embodiment shown in FIG. 19 is described below with further reference to FIG. 20. The complete frame signals output from the unique word detectors 26A and 26B are input to the frame error detectors 28A and 28B, respectively. The frame error detectors 28A and 28B evaluate unique word detection failures in the respective systems, and output a frame error signal accordingly. This operation is illustrated in FIG. 20. Referring to FIG. 20, the regenerated clocks A and B are output by the clock regenerators 25A and 25B, the evaluated data A and B are output by decoders 23A and 23B, and frame signals A and B are output by the unique word detectors 26A and 26B, respectively. The frame error signal B is output from frame error detector 28B.

If it is assumed that the unique word detector 26A finds the end of the unique word 92' and outputs the corresponding frame signal A at a given time as shown in FIG. 20, output of the frame signals from the other channels is monitored for a predetermined monitoring period. If frame signal B is output (the dotted line) during this monitoring period as shown in FIG. 20, the frame error signal B is not output. If, however, the frame signal B is not output (solid line) during this monitoring period, the frame error signal B is output at the end of the monitoring period. The monitoring period is used to avoid evaluation errors caused by transmission path/signal processing delay characteristics or jitter in the regenerated clocks, and must be at least as long as approximately one symbol period. FIGS. 19 and 20 also illustrate the use of two reception channels, but the above description also applies to three or more reception channels. In this case, the monitoring period starts at the timing of the earliest frame signal output by one of the other reception channels.

If a frame error is detected, the corresponding bandpass device is switched so that the passing band is changed or narrowed, or the center frequency of the passing band is changed, or the passing band is changed or narrowed and at the same time, the center frequency of the passing band is changed based on the frame error signal using the same means as described in the sixth embodiment above. When jamming interferes with reception, unique word detection fails and a frame error is generated. As a result, efficient jamming prevention can be achieved without greatly increasing the scale of the hardware, or reception characteristics balancing reception sensitivity with jamming prevention can be obtained as in the sixth embodiment. Furthermore, while the next decoding data packet may also be lost because the error detectors 29A and 29B must wait for the end of the decoding data packet before bit error detection and pass band or pass band width adjustment occurs after that, evaluation is completed at an early point in the decoding data packet in the present embodiment (see FIG. 16), and this type of problem thus does not occur in the present embodiment.

Figure 21:
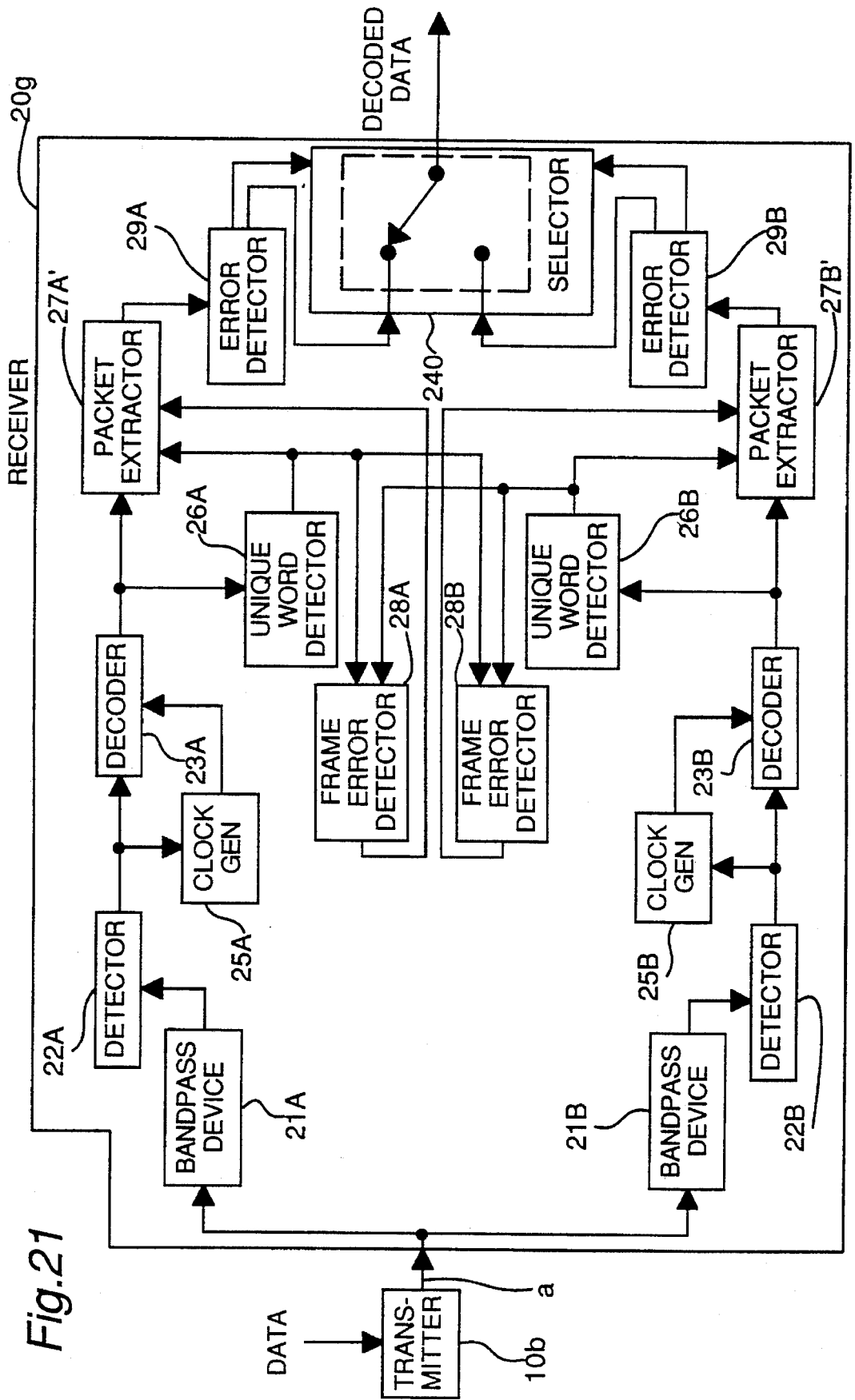
FIG. 21 is a block diagram of a data transmitting and receiving apparatus according to a eighth embodiment of the invention.

FIG. 21 is a block diagram of a data transmitting and receiving apparatus according to an eighth embodiment of the invention. The transmitter 10b in this embodiment is identical to the transmitter 10b of the fifth embodiment shown in FIG. 13. The configuration and operation of the receiver 20g are essentially identical to those of the receiver 20f in the seventh embodiment. This receiver 20g differs in that the packet extractors 27A' and 27B' can be triggered to extract the data packet not only by the frame signal from its own detection unit (same channel), but also by the frame error signal from the other detection unit (other channel). If the unique word detector of the same channel fails to detect the unique word to produce a frame signal, the packet extractors 27A' and 27B' may not be triggered to extract the data packet, but is triggered to extract the data packet by the frame error signals output by the frame error detectors 28A and 28B. Thus, in such a case, the packet extractors 27A' and 27B' will extract the decoded data packet based on the timing of the frame error signal from the other channel.

Figure 22:
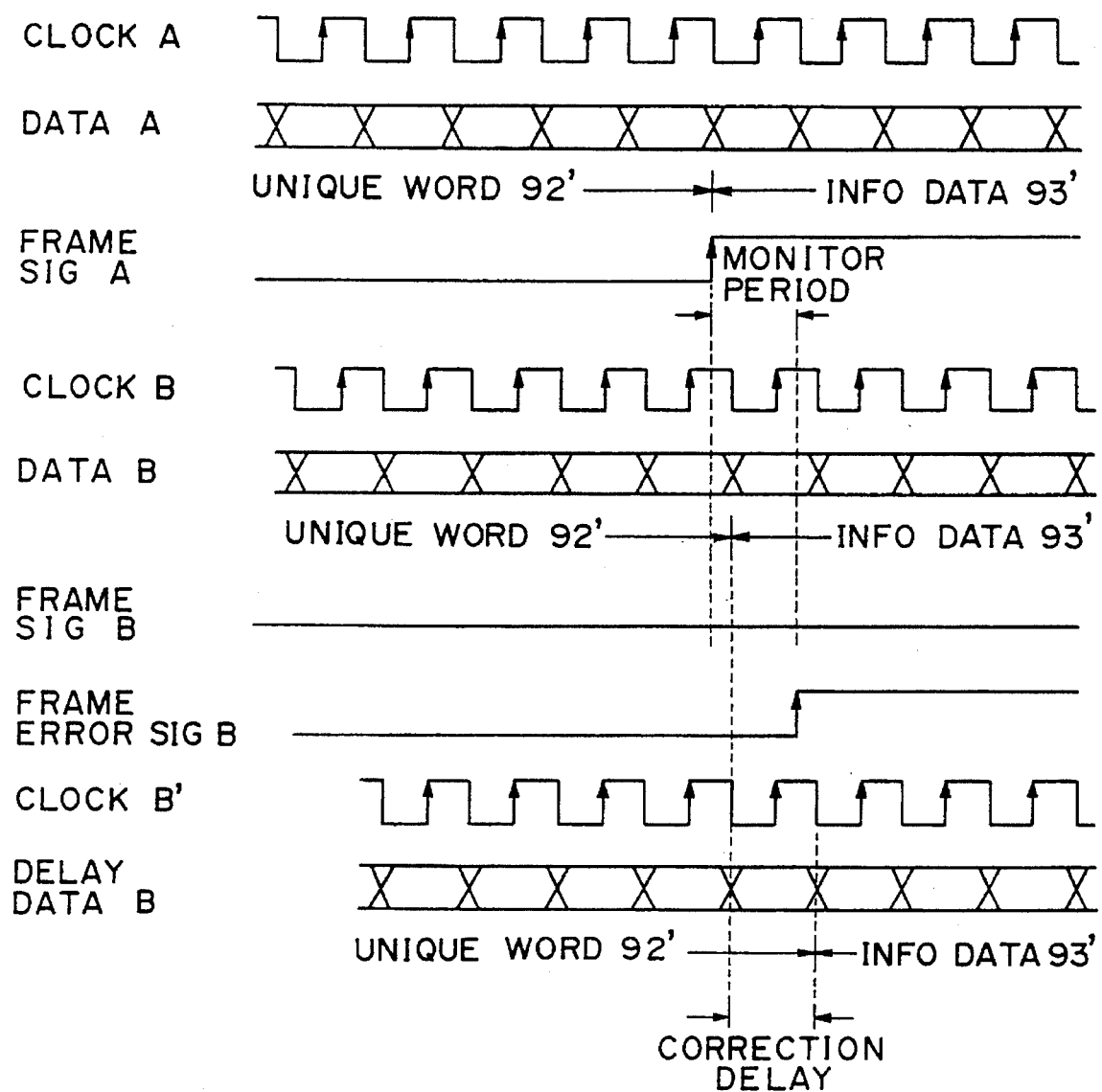
FIG. 22 is a diagram showing the operation of the receiver in the eighth embodiment.

The operation of the receiver 20g of the embodiment shown in FIG. 21 is described below with further reference to FIG. 22. Referring to FIG. 21, the frame error signals output by the frame error detectors 28A and 28B are input to the corresponding packet extractors 27A' and 27B'. The operation of the frame error detectors 28A and 28B illustrated in FIG. 22 is identical to that of the seventh embodiment shown in FIG. 20, and further description is therefore omitted. What differs from the seventh embodiment is that a decoded data packet extraction function is added to the packet extractors 27A' and 27B' so as to extract the decoded data packet in response to the frame error signal of the other channel. Specifically, when the frame signal B of a given channel (channel B in FIG. 22) is not output, the frame error signal B is substituted for the frame signal B, and an equivalent operation is performed on the delayed evaluated data B (to which a known correction delay is applied) and the regenerated clock B' (of which the timing is adjusted to the delayed evaluated data B) using the frame error signal B to extract the decoded data packet.

When the length of the unique word is set sufficiently long, the probability of false unique word detection is extremely low but the probability of not detecting unique words increases greatly. In particular, when burst transmission is used as in this embodiment, unique word bit errors caused by the AGC or tracking errors in the synchronization systems occur frequently even when bit errors are not present in the data block or error detection bits because the unique words are found at the beginning of each burst as shown in FIG. 14. As a result, unique words are undetected, extraction of decoded data packets fails, and data is lost. However, while the timing of the evaluated data of each reception channel may be affected by propagation delay differences, signal processing time differences, and cross time differences comparable to regenerated clock jitter, the duration of these factors is generally less than half of the symbol period, and is sufficiently short. As a result, the data block can be decoded in these cases even if the unique word is undetected by extracting the decoded data packet using the detection timing of another channel, and reception quality can be improved.

Because the frame error signal B is to begin with the frame signal A from a channel on which the unique word was detected delayed by the monitoring period as shown in FIG. 22, decoded data packet extraction is possible using the detection timing from another channel even if the unique word is not detected by setting the correction delay time equivalent to the monitoring period. While the correction delay time can be applied to evaluated data B (delayed evaluated data B) and the regenerated clock B simultaneously delayed by an equal amount (regenerated clock B'), it is sufficient to adjust the timing by the difference between an integer multiple of the repeat period and the correction delay time because the regenerated clock is a repeating wave. Note that because the monitoring period and correction delay time shown in FIG. 22 are one regenerated clock period, delay of the regenerated clock B is not necessary.

Note also that while FIG. 21 shows a receiver 20g with two reception channels, the receiver 20g can be expanded to three or more reception channels as in the seventh embodiment, in which case the description provided in the seventh embodiment also applies.

When 4-ary PSK or greater multilevel transmission is used, parallel/serial converters are provided in the decoders 23A and 23B as described in the fifth embodiment above. Because these parallel/serial converters output the evaluated data A and B and corresponding regenerated clocks A and B (the unique word detectors 26A and 26B compare bit strings in this case), the regenerated clocks and evaluated data (FIG. 22) can in this case be thought of as bit clocks and evaluation bit data (in a binary PSK channel the bit strings and symbol strings match). However, if there is a time difference between reception channels (of a maximum 0.5 symbol period), and the same-channel timing is estimated using the timing of another channel based on a bit clock with a short period ½ (in a 4-ary PSK system) or ⅓ (in an 8-ary PSK system) of the symbol clock period), bit shifting occurs and decoded data packet detection failures increase. To compensate during multilevel transmission with a 4-ary PSK or greater system in the present embodiment, the decoders 23A and 23B output evaluated data A and B (which are symbol strings) and the corresponding regenerated symbol clocks A and B (the unique word detectors 26A and 26B compare symbol strings in this case), and the regenerated clocks and evaluated data (FIG. 22) preferably express the symbol clock and evaluation symbol data. Conversion from a symbol string to a bit string is possible in this case by providing a parallel/serial converter immediately before the decoded data packet output of the packet extractors 27A' and 27B', or in the error detectors 29A and 29B. Alternatively, the last decoded data can be output as a symbol string.

Figure 23A:
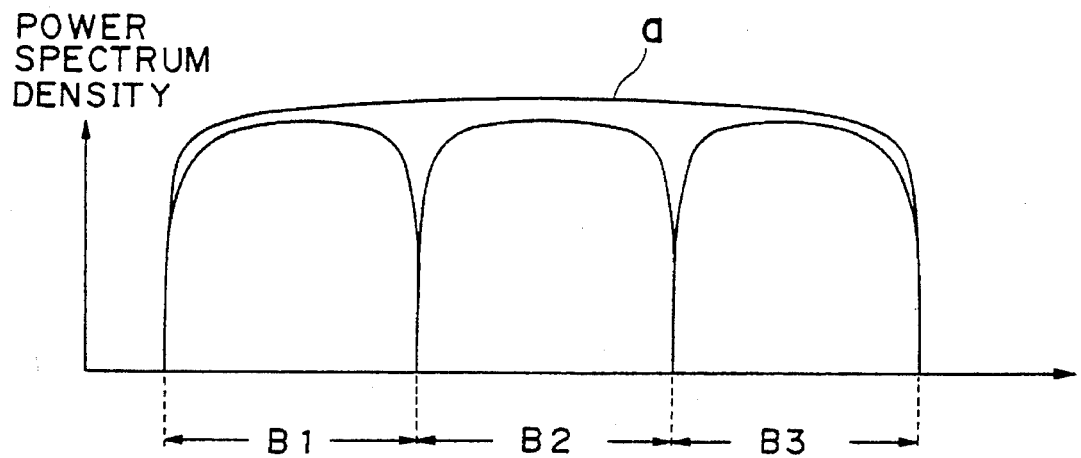
FIGS. 23a and 23b are a waveform diagram showing the signals at various points of the receiver when the spreading signal is a chirp signal in the eighth embodiment.
Figure 23B:
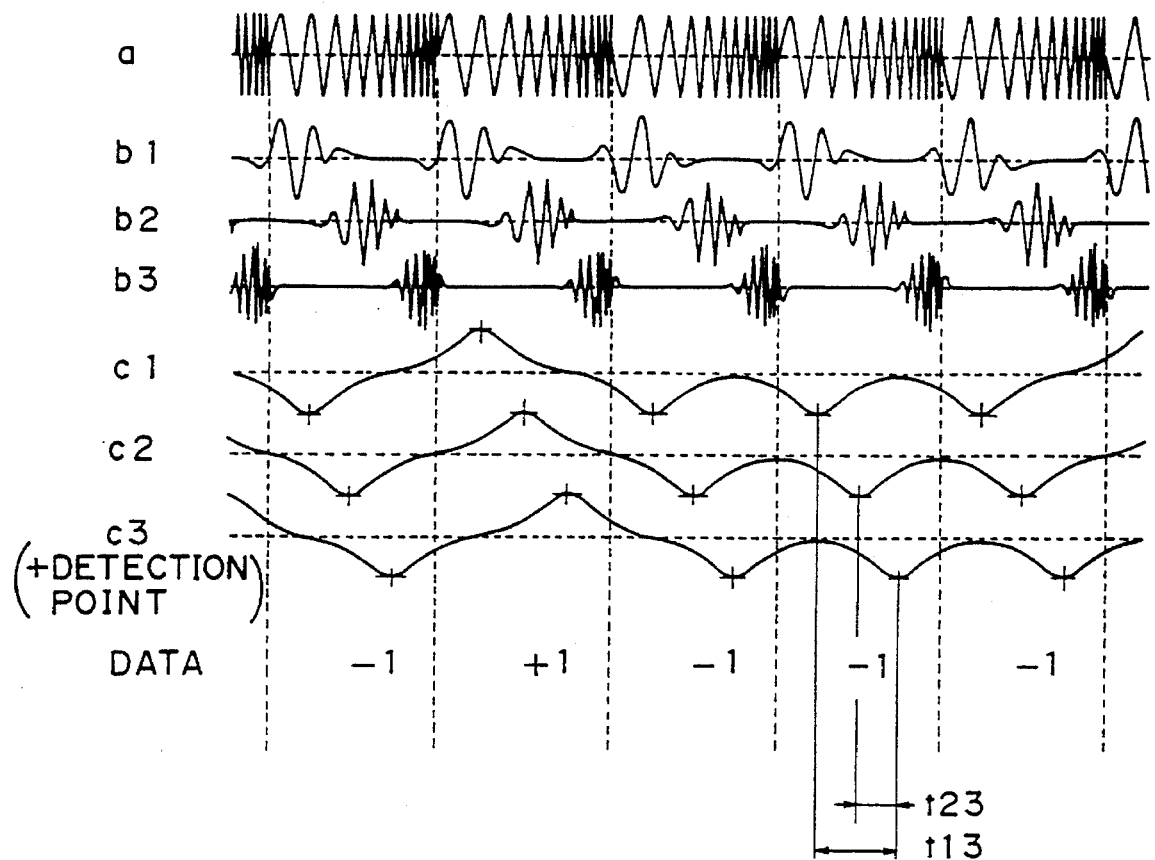

When the spreading signal q is a chirp signal as described in the fourth embodiment with reference to FIG. 12, the peak positions of the detector outputs differ and are determined by the pass band characteristics of the bandpass device 21A and 21B and the characteristics of the spreading signal q. The above correction delay time should therefore also add timing correction determined by the pass band characteristics of the bandpass device 21A and 21B and the characteristics of the spreading signal q as described below. This timing correction is illustrated in FIG. 23, a waveform diagram of the detection process as shown in FIG. 15 where a chirp signal is used for the spreading signal q. The pass bands B1–B3 of the bandpass device 21A and 21B are shown in FIG. 23a. The intermediate signals b1–b3 and detector outputs c1–c3 corresponding to the pass bands B1–B3 are shown in FIG. 23b according to the detection process. The detection operation is the same as in the first embodiment, and further description is omitted.

As shown in FIG. 23b, time t13 is the difference between the pulse peak position of detector output c1 and the pulse peak position of detector output c3, and time t23 is the difference between the pulse peak positions of detector outputs c2 and c3. These timing periods are clearly determined by the parameters of the chirp signal and the characteristics of the pass bands B1–B3. When the decoded data packets are extracted using the timing provided by the frame signal from another channel as in this embodiment, it is preferable to provide timing correction equivalent to the offset of the peak positions as described above (i.e., times t23 and t13 in FIG. 23). More specifically, the correction delay time shown in FIG. 22 is preferably the sum of the monitoring period and this timing correction period (the delay between the process channel and the frame signal reference channel). For example, when extracting the decoded data packet of the c1 detector output channel based on the frame signal from the c3 detector output channel, the correction delay time is the sum of the monitoring period and time t13 (which is a negative value reducing the delay).

Figure 24:
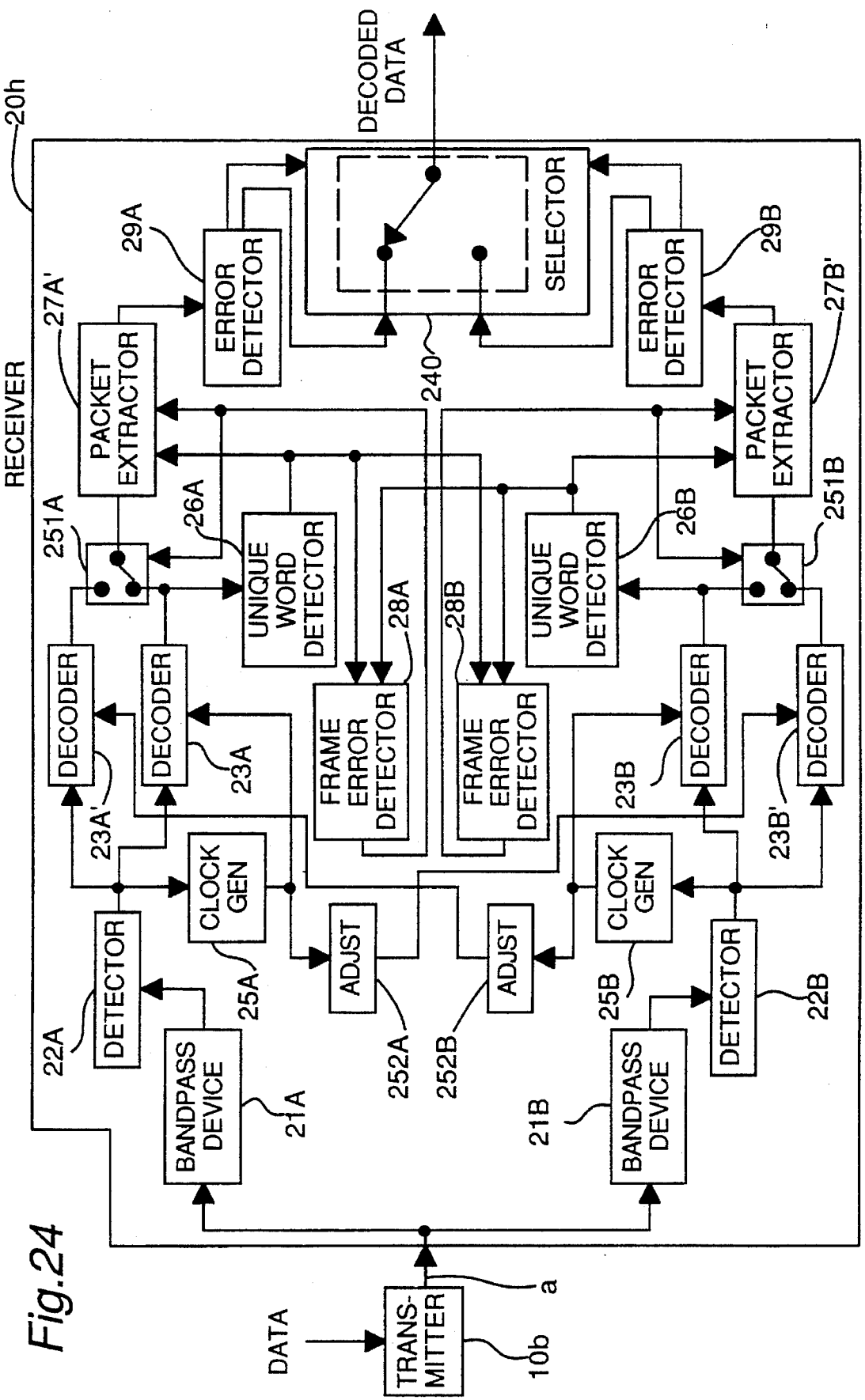
FIG. 24 is a block diagram of a data transmitting and receiving apparatus according to a ninth embodiment of the invention.

FIG. 24 is a block diagram of a data transmitting and receiving apparatus according to a ninth embodiment of the invention. The transmitter 10b in this embodiment is identical to the transmitter 10b of the fifth embodiment shown in FIG. 13. The configuration and operation of the receiver 20b are essentially identical to those of the receiver 20g in the eighth embodiment. This receiver 20h further has selectors 251A and 251B controlled by the outputs of the frame error detectors 28A and 28B, timing adjusters 252A and 252B for adjusting the timing of the regenerated clocks, and decoders 23A' and 23B' for referencing the regenerated clock of the other channel through the timing adjusters 252A and 252B and outputting the evaluated data.

When one unique word detector fails the unique word detection and the corresponding frame error detector outputs the frame error signal in this receiver 20h (FIG. 24), the decoded data packet is extracted from the evaluated data decoded using the regenerated clock output from the clock regenerator on the other channel.

The operation of the embodiment shown in FIG. 24 is described below with reference to FIG. 25. The timing adjusters 252A and 252B (FIG. 24) delay the regenerated clocks A and B output by the clock regenerators 25A and 25B by a predetermined period to adjust the timing, and output the regenerated clocks A' and B' to the other-channel decoders 23B' and 23A', respectively. The added decoders 23A' and 23B' output the evaluated data A' and B' based on the other-channel regenerated clocks B' and A', respectively. When the frame error signals are input from the corresponding frame error detectors 28A and 28B, the selectors 251A and 251B switch from the evaluated data A and B output from the normal decoders 23A and 23B (described in the fifth embodiment above) to the above evaluated data A' and B'. While various reasons can be offered to explain unique word detection failures, if the cause is a regenerated clock tracking failure, there is a high probability of bit errors being contained in the extracted decoded data even when using the unique word timing from the other channel as described in the eighth embodiment. An improvement in reception quality can be expected in the present embodiment, however, because the regenerated clock is also supplied from the other channel.

Figure 25:
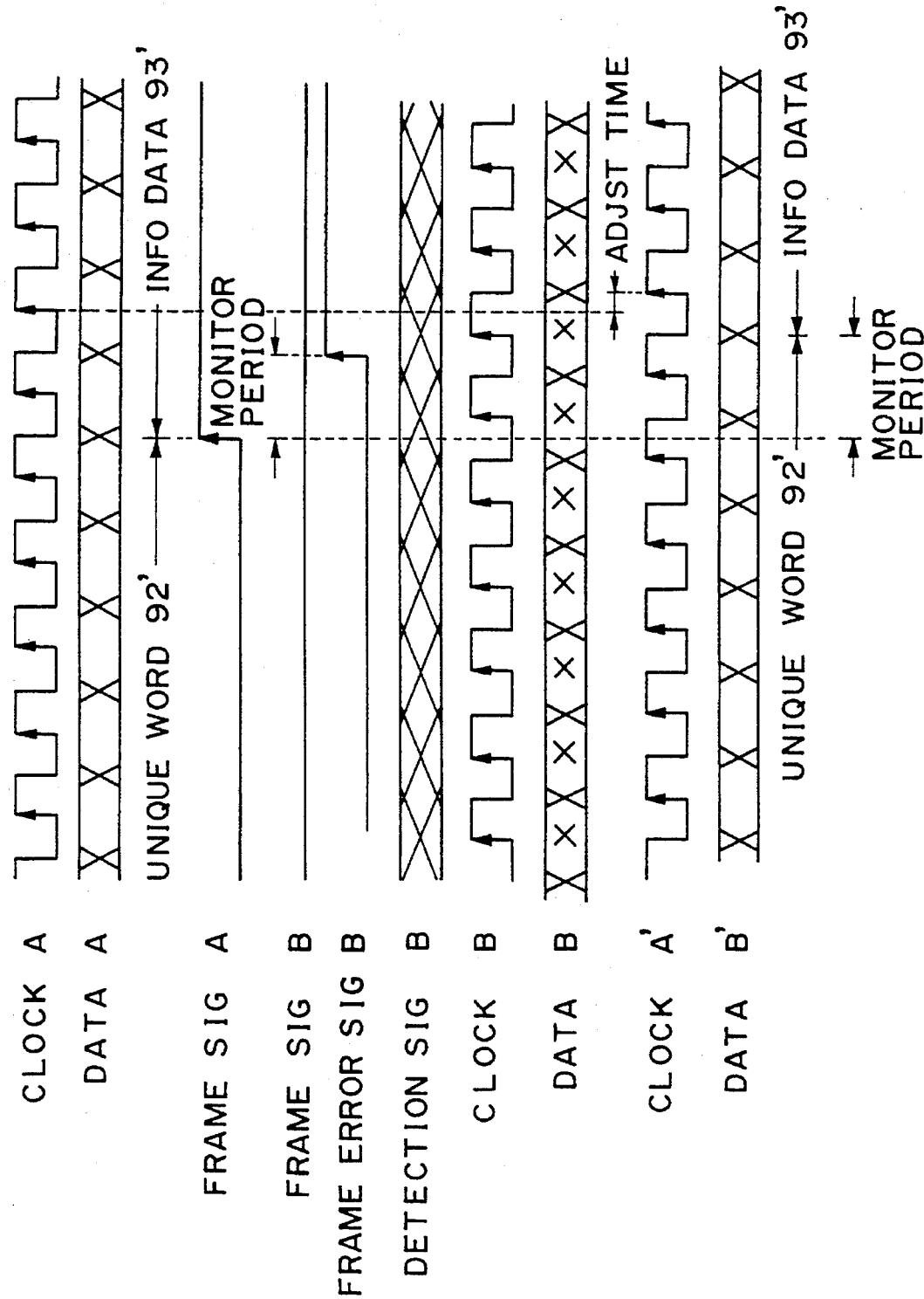
FIG. 25 is a diagram showing the operation of the receiver in the ninth embodiment.

Operation when there is a unique word detection failure on channel B is illustrated in FIG. 25. Specifically, FIG. 25 shows the timing at the edge of the eye pattern (the diamond shaped area in the detector output B) resulting from the regenerated clock B output from the same-channel clock regenerator 25B not accurately tracking the detector output B of the differential detector 22B. As a result there is a high probability of bit errors being contained in the evaluated data B output by the decoder 23B. On the other hand, there is a low probability of bit errors being contained in the evaluated data B' output by the decoder 23B' using the regenerated clock A' obtained through the timing adjuster 252A from the regenerated clock A output by the other-channel clock regenerator 25A. If bit errors occur in the evaluated data B, unique word detection fails, and the frame error signal B is output as described in the seventh embodiment. The selector 251B therefore supplies evaluated data B' to the packet extractor 27B', which substitutes the frame error signal B for the frame signal and begins the decoded data packet extraction operation as described in the eighth embodiment. An improvement in reception quality even greater than that obtained with the eighth embodiment can therefore be expected because evaluated data B' having a high probability of good data is selected.

Note that the adjustment time of the timing adjusters 252A and 252B is normally equivalent to the signal processing delay, or can be completely eliminated, but it is necessary to add a delay period determined by the frequency sweep parameters of the spreading signal q and the characteristics of each bandpass device (as shown by t23 and t13 in FIG. 23 in the eighth embodiment) when the spread spectrum signal a is a chirp signal within each symbol period. For the correction delay time, however, it is sufficient to delay the monitoring period equivalent by the regenerated clock repeat period. Unlike the eighth embodiment, however, this correction is applied not to the input side of the packet extractors 27A' and 27B' but to the detector output c on the input side of the decoders 23A' and 23B' or the evaluated data on the output side.

Note also that, as in the eighth embodiment, only two reception channels are shown in FIG. 24, but the receiver 20h may be expanded to three or more channels, in which case the description provided in the eighth embodiment applies.

In addition, during 4-ary PSK or greater multilevel transmission, the decoders 23A, 23B and 23A', 23B' may comprise an internal parallel/serial converter and output a bit clock and evaluation bit data, but it is preferable to output the symbol clock and evaluation symbol data to reduce the occurrence of decoded data packet extraction failures due to bit shifting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;

(a) delay means for delaying the intermediate signal for an integer multiple of the symbol period of the data modulated signal; and (b) multiplying means for multiplying said intermediate signal with said delayed intermediate signal;

unique word detection means for detecting a unique word and for producing a frame signal;

packet extraction means for extracting information bits in response to said frame signal; and bit error detection means for detecting bit errors using error detection bits and for producing a bit error signal;

wherein said spread spectrum signal is presented in data packets formed by dividing an input bit stream into blocks of information bits, and adding at least said unique word and error detection bits to said information bits, said unique word inserted at a beginning of said information bits in each data packet, and wherein said spreading signal is a chirp signal obtained by repeatedly sweeping a frequency of a sine wave every symbol period.

2. A data receiving apparatus according to claim 1, wherein said bandpass means comprises:

a local oscillator for producing a local oscillation signal;

a frequency mixer for mixing said spread spectrum signal with said local oscillation signal and producing a frequency mixed signal; and a bandpass filter for filtering a partial band signal from said frequency mixed signal.

3. A data receiving apparatus according to claim 2, wherein said local oscillator oscillates at a frequency selected from a plurality of different frequencies in which frequency differences are integer multiples of an inverse of a symbol period of said data modulated signal.

4. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal for each of at least two of said different pass bands;

detecting means for detecting data directly from each intermediate signal and for producing detector output signals comprising;

(a) delay means for delaying the intermediate signal for an integer multiple of the symbol period of the data modulated signal; and (b) multiplying means for multiplying said intermediate signal with said delayed intermediate signal;

combining means for combining the detector output signals and for producing a synthesized detector output signal; and a decoder for detecting data based on the synthesized detector output signal;

wherein said spreading signal is a chirp signal obtained by repeatedly sweeping a frequency of a sine wave every symbol period.

5. A data receiving apparatus according to claim 4, wherein said combining means comprises adding means for adding detector output signals from different pass bands.

6. A data receiving apparatus according to claim 5, wherein said adding means comprises delay means for delaying detector outputs from different pass bands by different time periods to match peak points of said detector outputs, and an adder for adding the delayed detector outputs.

7. A data receiving apparatus according to claim 1, wherein said bit error detection means comprises a parity check circuit.

8. A data receiving apparatus according to claim 1, wherein said bit error detection means comprises a cyclic redundancy check circuit.

9. A data receiving apparatus according to claim 1, further comprising clock regeneration means for regenerating clocks from said detector output, and decoding means for decoding a bit stream of data in accordance with said regeneration clocks.

10. A data receiving apparatus according to claim 9, wherein said bandpass means, said detection means, said clock regeneration means, said decoding means, said unique word detection means, said packet extraction means, and said bit error detection means are provided at least in two channels.

11. A data receiving apparatus according to claim 10, further comprising a frame error detection means for detecting a failure of detection of said unique word by said unique word detection means and for producing a frame error signal.

12. A data receiving apparatus according to claim 11, wherein said bandpass means, said detection means, said unique word detection means, said packet extraction means, said bit error detection means, and said frame error detection means are provided in two channels.

13. A data receiving apparatus according to claim 12, wherein said packet extraction means extracts said information bits and said error detection bits from each data packet in response to said frame signal from a first channel when said frame error detection means in a second channel produces said frame error signal.

14. A data receiving apparatus according to claim 12, wherein said frame error detection means in a first channel further detects a failure of detection of said unique word by said unique word detection means in a second channel and produces a quasi frame signal, said decoding means comprising auxiliary decoding means operated by said clocks from clock regeneration means in the second channel, said auxiliary decoding means in the first channel being selected when said unique word detection means in the first channel fails to detect said unique word.

15. A data receiving apparatus according to claim 14, wherein said clock regeneration means comprising time adjusting means for adjusting a clock phase of said clocks applied to the second channel.

16. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;
(a) delay means for delaying the intermediate signal for an integer multiple of the symbol period of the data modulated signal; and
(b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

packet extraction means for extracting information bits from each data packet in response to said frame signal;

bit error detection means for detecting bit errors in the decoded data packets using error detection bits and for producing a bit error signal; and a plurality of channels, each channel comprising said bandpass means, said detection means, said clock regeneration means, said decoding means, said unique word detection means, said packet extraction means, and said bit error detection means, said selecting means selecting said information bits in one of said plurality of channels based on said bit error signal produced by each of said bit error detection means;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet.

17. A data receiving apparatus according to claim 16, wherein said selecting means selects among said plurality of different pass bands based on a minimum bit error.

18. A data receiving apparatus according to claim 16, wherein said bit error detection means comprises a parity check circuit.

19. A data receiving apparatus according to claim 16, wherein said bit error detection means comprises a cyclic redundancy check circuit.

20. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;

(a) delay means for delaying the intermediate signal for an integer multiple of the symbol period of the data modulated signal; and (b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

packet extraction means for extracting information bits from each data packet in response to said frame signal; and bit error detection means for detecting bit errors in the decoded data packets using error detection bits and for producing a bit error signal;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet, and wherein said bandpass means changes a center frequency of said pass band when said bit error detection means produces said bit error signal.

21. A data receiving apparatus according to claim 20, wherein said bit error detection means comprises a parity check circuit.

22. A data receiving apparatus according to claim 20, wherein said bit error detection means comprises a cyclic redundancy check circuit.

23. A data receiving apparatus according to claim 20, said bandpass means comprising:

a local oscillator for producing a local oscillation signal;

a frequency mixer for mixing said spread spectrum signal with said local oscillation signal and producing a frequency mixed signal; and a bandpass filter for filtering a partial band signal from said frequency mixed signal;

wherein said local oscillator oscillates at a frequency selected from a plurality of different frequencies in which frequency differences are integer multiples of an inverse of said symbol period of said data modulated signal.

24. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;

(a) delay means for delaying the intermediate signal for an integer multiple of the symbol period of the data modulated signal; and (b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

packet extraction means for extracting information bits from each data packet in response to said frame signal; and bit error detection means for detecting bit errors in the decoded data packets using error detection bits and for producing a bit error signal;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet, and wherein said bandpass means narrows a bandwidth of said pass band when said bit error detection means produces said bit error signal.

25. A data receiving apparatus according to claim 24, wherein said bit error detection means comprises a parity check circuit.

26. A data receiving apparatus according to claim 24, wherein said bit error detection means comprises a cyclic redundancy check circuit.

27. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;

(a) delay means for delaying the intermediate signal for an integer multiple of the symbol period of the data modulated signal; and (b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

frame error detection means for detecting, by said unique word detection means, a failure of detection of said unique word in one channel when said unique word in said one channel is not detected within a predetermined period of time after detection of said unique word in another channel and for producing a frame error signal;

packet extraction means for extracting information bits from each data packet in response to said frame signal; and bit error detection means for detecting bit errors in the decoded data packets using error detection bits and for producing a bit error signal;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet, and wherein said bandpass means changes a center frequency of said pass band when said frame error detection means produces said frame error signal.

28. A data receiving apparatus according to claim 27, said bandpass means comprising:

a local oscillator for producing a local oscillation signal;

a frequency mixer for mixing said spread spectrum signal with said local oscillation signal and producing a frequency mixed signal; and a bandpass filter for filtering a partial band signal from said frequency mixed signal;

wherein said local oscillator oscillates at a frequency selected from a plurality of different frequencies in which frequency differences are integer multiples of an inverse of a symbol period of said data modulated signal.

29. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;

(a) delay means for delaying the intermediate signal for an integer multiple of the symbol period of the data modulated signal; and (b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

frame error detection means for detecting, by said unique word detection means, a failure of detection of said unique word in one channel when said unique word in said one channel is not detected within a predetermined period of time after detection of said unique word in another channel and for producing a frame error signal;

packet extraction means for extracting information bits from each data packet in response to said frame signal; and bit error detection means for detecting bit errors in the decoded data packets using error detection bits and for producing a bit error signal;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet, and wherein said bandpass means narrows a bandwidth of said pass band when said frame error detection means produces said frame error signal.

30. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

detection means for detecting data directly from said intermediate signal and for producing a detector output comprising;

(a) delay means for delaying the intermediate signal for an integer multiple of the symbol period of the data modulated signal; and (b) multiplying means for multiplying said intermediate signal with said delayed intermediate signal;

adding means for adding said detector output from said plurality of different pass bands and for producing an adder output; and decoder means for decoding said adder output and for reproducing said data;

wherein said spreading signal is a chirp signal obtained by repeatedly sweeping a frequency of a sine wave every symbol period.

31. A data receiving apparatus according to claim 30, wherein said adding means comprises delay means for delaying detector outputs from different pass bands by different time periods to match peak points of said detector outputs, and an adder for adding the delayed detector outputs.

32. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;
  (a) delay means for delaying the intermediate signal for an integer multiple of the symbol period of the data modulated signal; and
  (b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

frame error detection means for detecting, by said unique word detection means, a failure of detection of said unique word in one channel when said unique word in said one channel is not detected within a predetermined period of time after detection of said unique word in another channel and for producing a frame error signal;

packet extraction means for extracting information bits from each data packet in response to said frame signal; and bit error detection means for detecting bit errors in the decoded data packets using error detection bits and for producing a bit error signal;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet, and wherein said bandpass means, said detection means, said unique word detection means, said packet extraction means, said bit error detection means and said frame error detection means are provided in each of a plurality of channels, and wherein said packet extraction means in one of said plurality of channels extracts said information bits from each data packet in response to said frame error signal produced by said frame error detection means in said one of said plurality of channels.

33. A data receiving apparatus for receiving a spread spectrum signal formed by modulating a carrier wave with data to produce a differential PSK data modulated signal and multiplying the data modulated signal with a spreading signal which has a bandwidth greater than that of the data modulated signal, wherein a period of said spreading signal is equal to a symbol period of the data modulated signal, said receiving apparatus comprising:

bandpass means for passing one of a plurality of different pass bands of a full band of said spread spectrum signal, each pass band having a bandwidth which is greater than a frequency equal to an inverse of said symbol period, and for producing an intermediate signal;

means for selecting a pass band among said plurality of different pass bands of said spread spectrum signal;

detection means for detecting data directly from said intermediate signal and for producing a detector output comprising;
  (a) delay means for delaying the intermediate signal for an integer multiple of the symbol period of the data modulated signal; and
  (b) multiplying means for multiplying said intermediate signal with said delayed intermediate signal;

clock regeneration means for regenerating a clock signal from said detector output, and decoding means for decoding said detector output to produce a bit stream of data in accordance with said regeneration clock signals;

unique word detection means for detecting a unique word from said bit stream of data and for producing a frame signal;

frame error detection means for detecting, by said unique word detection means, a failure of detection of said unique word in one channel when said unique word in said one channel is not detected within a predetermined period of time after detection of said unique word in another channel and for producing a frame error signal;

packet extraction means for extracting information bits from each data packet in response to said frame signal; and bit error detection means for detecting bit errors in the decoded data packets using error detection bits and for producing a bit error signal;

wherein said spreading signal is a chirp signal obtained by repeatedly sweeping a frequency of a sine wave every symbol period, and wherein said spread spectrum signal is presented in data packets formed by dividing an input bit stream into blocks of information bits, and adding at least said unique word and error detection bits to said information bits, said unique word inserted at a beginning of said information bits in each data packet, and wherein said bandpass means, said detection means, said clock regeneration means, said decoding means, said unique word detection means, said frame error detection means, said packet extraction means, and said bit error detection means are provided in each of a plurality of channels, and wherein said decoding means in one of said plurality of channels comprising auxiliary decoding means operated by said clock regeneration means in another of said plurality of channels, said auxiliary decoding means in said one of said plurality of channels being selected when said frame error detection means in said one of said plurality of channels produces said frame error signal.

34. A data receiving apparatus according to claim 33, wherein said clock regenerating means in said another of said plurality of channels comprising time adjusting means for adjusting a clock phase of said clock signals applied to the said one of said plurality of channels in accordance with a difference between a center frequency of said one of said plurality of channels and a center frequency of said another of said plurality of channels.

* * * * *

UNITED STATES PATENT AND TRADEMARK OFFICE
CERTIFICATE OF CORRECTION

PATENT NO. : 5,504,774
DATED : April 2, 1996
INVENTOR(S) : H. TAKAI et al.

It is certified that error appears in the above-indentified patent and that said Letters Patent is hereby corrected as shown below:

On the cover, in section [56], "References Cited", "U.S. PATENT DOCUMENTS", insert ---4,017,798  4/1977 Gordy et al. 375/1---.

On the cover, in section [56], "References Cited", "U.S. PATENT DOCUMENTS", insert ---4,575,861  3/1986 Levreault 375/1---.

On the cover, in section [56], "References Cited", "U.S. PATENT DOCUMENTS", insert ---4,962.507  10/1990 Renshaw 375/1---.

Signed and Sealed this

Eleventh Day of February, 1997

Attest:

BRUCE LEHMAN

*Attesting Officer*    *Commissioner of Patents and Trademarks*